(12) United States Patent
Paszkowski

(10) Patent No.: US 6,994,045 B2
(45) Date of Patent: Feb. 7, 2006

(54) SUPERHYDROPHOBIC COATING

(75) Inventor: Mariusz Paszkowski, Krakow (PL)

(73) Assignee: CNT Spolka Z O.O., Krakow (PL)

( * ) Notice: Subject to any disclaimer, the term of this patent is extended or adjusted under 35 U.S.C. 154(b) by 56 days.

(21) Appl. No.: 10/493,054

(22) PCT Filed: Oct. 29, 2002

(86) PCT No.: PCT/PL02/00078

§ 371 (c)(1),
(2), (4) Date: Apr. 28, 2004

(87) PCT Pub. No.: WO03/037702

PCT Pub. Date: May 8, 2003

(65) Prior Publication Data
US 2005/0061221 A1 Mar. 24, 2005

(30) Foreign Application Priority Data
Nov. 2, 2001 (PL) .................... 350498

(51) Int. Cl.
B63B 1/38 (2006.01)

(52) U.S. Cl. .................... 114/67 R; 244/204
(58) Field of Classification Search ............ 114/167 R
See application file for complete search history.

(56) References Cited

U.S. PATENT DOCUMENTS 3,154,460 A * 10/1964 Graner et al. ............... 424/407
3,554,154 A * 1/1971 Thomas ....................... 114/222
4,932,612 A * 6/1990 Blackwelder et al. ....... 244/207
5,133,519 A * 7/1992 Falco .......................... 244/200
5,445,095 A * 8/1995 Reed et al. ................ 114/67 A
6,024,119 A * 2/2000 Kirschner ................. 137/487.5
6,096,430 A * 8/2000 Brady et al. ............. 428/423.1

FOREIGN PATENT DOCUMENTS

EP 0616940 9/1994
JP 08268378 2/1997

* cited by examiner

Primary Examiner—Jesus D. Sotelo

(74) Attorney, Agent, or Firm—Dennison, Schultz, Dougherty & MacDonald

(57) ABSTRACT

This invention solves the problem of reducing the fluid friction resistance accompanying relative movement of surfaces of a solid and a liquid. A superhydrophobic coating acting as a substrate for a gaseous lubricant of very low viscosity, reducing the fluid skin friction, has a hierarchic fracal structural of the surface wherein the forms of the first hierarchic level (2, 3, 9) are located at the coating's substrate, and the forms of each successive hierarchic level (22, 33, 99) are located on the surface of the previous hierarchic level and the forms of individual higher hierarchic levels reiterate the forms of the lower hierarchic levels. Forms of at least two hierarchic levels of rows (2, 22) and ridges (3, 33, 99) occur in the coating and, also, the surface has anisotropic geometry, maximally developed fractally in the direction transverse to the direction of flow and maximally smooth in the direction of flow and, also, has channels located in the coating's substrate to ensure gas flow.

16 Claims, 25 Drawing Sheets

I-I

II - II

SUPERHYDROPHOBIC COATING

FIELD OF THE INVENTION

The object of the present invention is a superhydrophobic coating used as a substrate for gaseous lubricant of very low viscosity, reducing the surface friction of flowing liquids. The invention relates to specific coatings whose physico-chemical properties relative to the liquid in contact with them are referred to as superhydrophobicity. This phenomenon, occurring where three phases—solid, liquid and gaseous—are in contact with each other, leads to the formation and retention of an air film on the submerged surface of the coating, which acts as a gaseous lubricant of very low viscosity, thus reducing the flow viscous resistance (skin friction). The fields that the invention is related to include fluid mechanics, construction of machines involving flowing liquids, water engineering, water transportation, pipeline transportation of water and other liquids, especially fuels, chemicals, liquefied gases or transportation of water in open channels.

BACKGROUND OF THE INVENTION

The main physical barrier limiting the effectiveness and velocity of transportation of liquids and in liquids lies in the fact that the driving systems have to overcome significant resistance accompanying the movement of vehicles or the movement of liquids transported through pipelines. The aero- and hydrodynamic resistance increases in proportion to the cube of relative velocity of the object and the fluid. One of the many ways proposed to reduce flow resistance of liquids (skin drag) is intentional modification of physico-chemical and geometric properties of surfaces in contact with a flowing liquid. The relevant solutions to this problem described so far in the literature can be classified into two main categories, referred to as passive: or active ones.

Standard passive methods of lowering the resistance by limiting the development of turbulence involve, among other methods, modification of the geometry of objects around which a liquid flows. Most often flat and smooth surfaces, once considered optimal from the point of view of hydrodynanics, are covered with three-dimensional relieves. Known forms of surface three-dimensional arrangements and relieves have the form of parallel grooves (U.S. Pat. No. 5,171,623), microsteps (U.S. Pat. No. 5,133,519), depressions (U.S. Pat. No. 5,171,623) and scales (U.S. Pat. No. 5,114,099) with submilimeter to centimetre dimensions.

Also known are active systems of complex spatially arranged coatings equipped with a system of mobile, independent projections driven by micro servo-actuators, or tabs equipped with individual pressure sensors controlling each projection separately. Such systems are designed to actively dump turbulence or, to be more precise, to reduce it. Also known are designs with injection of liquid polymers or fine-grain suspensions, e.g. asbestos or polymer fibres into the inter-face, into the zone where the vessel's bottom and sides are in contact with water flowing around them.

In U.S. Pat. No. 5,445,095, a combination of the above-presented technologies has been proposed: injection of polymers onto a surface with parallel grooves; similar combinations of active and passive methods to reduce resistance are also shown in U.S. Pat. No. 4,932,612.

Also a design referred to as "sliding wall" was proposed involving the use of coatings stationary relative to the liquid and mobile relative to the flowing body.

The most recent and most effective among the known methods of reducing hydrodynamic resistance involve the reduction or almost complete elimination of immediate contact between the liquid and the object it flows around. It can be achieved by separating the two phases by a gaseous phase, for instance, by injecting compressed air into systems of straps, channels or shelves placed in the vessel's plating, by injecting a cloud of gas bubbles into the contact zone, or by employing the phenomenon of supercavitation. The injection of gas bubbles into the liquid-solid contact zone can be done through a porous, permeable surface or through a system of minute channels and nozzles, which in both cases require the use of gas distribution systems and also, in the case of submarine vessels, some storage facilities (patent application WO 8807956).

It was also proposed to force exhaust gases under the vessel's bottom or to employ the air entrained owing to viscous friction and later spontaneously sucked in by a system of appropriate nozzles (U.S. Pat. No. 5,545,063).

Some other radical solution reducing hydrodynamic resistance employs the so-called supercavitation a phenomenon involving the formation of a spindle-shaped cavity filled with water steam, moving along with the object. Such a cavity forms spontaneously around a body travelling through liquid environment at velocities greater than 50 metres per second and requires an appropriate, rounded bow. Such great velocities require very effective drive systems, e.g. a rocket engine.

A permanent, stable gaseous film (passive "lubricant") can be much easier produced between a solid and liquid (in relative movement to each other) by making the solid's surface superhydrophobic. Superhydrphobicity means that a liquid has a contact angle between 160 and 180 degrees on the surface; in the case of nonwettability by other liquids, e.g. fats or mineral oils such phenomenon is, called lipophobicity. An example of material that is both hydro- and lipophobic is fluorine polymer Teflon®; a substance with properties opposite to those of diamond—a highly hydrophobic material that is wetted by fats—i.e. lipophylic. The phenomenon of superhydrophobicity is conditioned upon appropriate surface geometry. The contact angle of water measured relative to a completely flat surface of a solid never exceeds 140 degrees, even for most hydrophobic surfaces.

Also available on the market are numerous agents for making hydrophobic coatings, in the form of solutions to be applied onto surfaces, paints, self-adhesive foils, etc. The paints and coatings of this kind have a property permitting them to be self-cleaned from particles sticking to them—they also do not become frosted or iced. Due to the extremely low hydrophobicity of such artificial coatings a gaseous film is retained on the surface of a body placed in the bulk of a liquid, with no contact with its surface. This property permitting a gaseous film to remain under water has been employed to produce hydrophobic coatings designed to cover e.g., the bottom and the sides of a vessel or the interior of pipelines, thus reducing the viscous drag (U.S. Pat. No. 5,476,056).

Thus produced decrease in drag relates only to selected parameters of movement, and only to the vessel's flat bottom limited by side stripes. The greatest reduction occurs at low velocities: it must be accompanied by injection of additional portions of gas to make up the losses within the irregular gaseous film carried away by the moving, rough surface of the liquid flowing relative to the surface and also "scraped off" by the turbulence.

The hydrophobic surfaces employed so far do not have fully controlled geometry and are usually isotropic. They are formed, for instance, by wax crystallizing on a surface in the form of three-dimensional crystallites, or by spraying paints containing chemically hydrophobised silica grains.

U.S. Pat. No. 5,476,056 proposes such coatings of controlled geometry to be formed by e.g., by lithography, screen printing or electroforming. As a result of employing a chaotic or regular, yet isotropic geometry of the relief (patent application WO 0050232), such coatings can reduce the viscous flow resistance to a much lesser degree than it is theoretically possible when using a gaseous lubricant. The viscosity of air is hundreds times lower than that of water, and the viscosity of hydrogen is still lower, which is why the viscous drag of the fluid in contact with a gas film can be theoretically lowered by a factor of over a hundred as compared to a fully wetted immersed surface. Due to the isotropic, and usually chaotic and haphazard geometry of the coatings used so far, the surface in contact with the liquid's meniscus (the outermost, monomolecular meniscus i.e. liquid surface film, flexible due to surface tension) is covered with microcorrugations transverse to the direction of movement and reproduces, like a negative casting the spatial arrangement of the surface. Consequently, these roughness moving relative to the passing liquid "scratch" its deeper layers, more distant from the coating's surface. This causes the near-the-surface layer to be sheared and carried away with the movement of the rigid coating, the layer being carried away relative to the stationary bulk of the liquid, which leads to internal shearing and favours the creation of turbulence. Conversely, irregularities of the liquid's surface convex in the direction of the coating, carry away, scrape off and destroy the gaseous film.

The process of losing the hydrophobic lubricant is accelerated by "wind" waves, which appear on the liquid's surface—delicate after expansion of the gaseous cushion. Those "wind" waves develop due to fast jets of gas carried away with the gas layer. Irregularities of the gas film, thickened by injection of extra air, produce a similar effect. In the presented system with intense aeration through a single gap in the front part of the vessel plating, the coating can only be applied to the flat bottom rather than to the sides. Some parts of such chaotic coating are, due to accidental pattern defects, too irregular for the phenomenon of superhydrophobicity to occur and such thin liquid "bridges" connecting the liquid and the locally wetted defected surface not only increase the general drag, but can initiate intense turbulence and generate a cloud of bubbles, thus causing increased destruction of the gas film.

Anisotropic, superhydrophobic surfaces, linear in whole or in some sections, produced for experimental purposes by lithography on the surface of silicon crystals were also described (Bico J., Marzolin C., & Quere D., 1999, Pearl drops. *Europhys. Lett.* 47(2), pp. 220–226). The relieves under study contained only a simple system of parallel microgrooves and microribbs and the contact angle produced was slightly in excess of 130 degrees and depended strongly on the direction of the measurement. This type of surface arrangement has not been-proposed so far to reduce hydrodynamic resistance.

U.S. Pat. No. 5,054,412 discloses a solution which combines some of the known technologies described above: a system of macroscopic grooves parallel to the direction of flow, covered with hydrophobic coating. The grooves, constituting a structure that counteracts the development of turbulence, play the role of traps which retain the gaseous film and protect it against being washed out. The film is produced by injecting gas through a system of nozzles. In this solution macroscopic grooves of the same structural level were used Another system in use is the technology of the underwater flocked coatings "Sealcoat" manufactured by the Creative Coating Corporation. "Sealcoat" consists of a layer of densely packed short, thin polymer threads, applied electrostatically directly onto the vessel's bottom or sides covered by appropriate resin. Such a coating, looking like velvet or seal, has high mechanical resistance and is also resistant, in spite of nontoxicity, to being inhabited by incrustating water organisms. Thus created coating is not planned to be hydrophobised. The fibrous "Sealcoat" coating is isotropic and chaotic. Fibrous textile hydrophobic materials are known as chaotic structures such as unwoven and woven fabrics. All known coating structures, designed mainly for the textile industry, are not adapted or designed to reduce hydraulic resistance.

The technological objective of this invention is to give to the coating such geometry that would make it hydrophobic, which means that the wetting angle relative to water or other liquids will be close to a straight angle that is its affinity to gaseous phase will exceed the affinity to liquid phase.

The superhydrophobic coating, optimized in terms of its ability to reduce viscous flow resistance, should be applied not only under the ship's bottom but also on its sides or inside a pipeline. The main parameters determining usefulness of such coating should be its mechanical and physicochemical durability, stability and uniform thickness of the gaseous film and the degree to which it reduces viscous resistance as compared to a fully wetted flat surface without any relief.

DISCLOSURE OF THE INVENTION

The technological objective as specified above was solved by designing a new coating in accordance with this invention, having a reproducible, three-dimensional anisotropic geometry and structure.

To produce considerable reduction in resistance, the new coating must be given a precisely defined anisotropic, fractal geometry, in particular one that would depend on the planned direction of fluid flow. The anisotropy relates to the geometry—the directional character of fractal roughness and to the difference in wettability along different directions.

According to this invention, it is proposed to use fully anisotropic coatings as regards their geometry, that is ones that are linearly and fractally arranged in a scale ranging from tens of micrometers down to several manometers, transversely to the direction of movement, and, in extreme cases, of almost molecular size, and smooth in the direction of flow. The fractal dimension of such linear structures results from their hierarchical structure: from the forms of the first level having the form of grooves and ridges with widths of several to tens of micrometers, covered, in turn, by grooves and ridges ranging from hundreds to thousands nanometers, to the finest ones whose cross section has the size of several nanometers. Considering that only the outermost portions of individual hierarchic levels are wetted, such structures should be characterised by a very small surface of effective contact between the solid and liquid, even below 1% of the coating surface. The present solution produces a dramatic reduction in drag as compared to superhydrophobic coatings known so far, whether chaotic or isotropic. The gaseous film, acting as lubricant in the solution according to this invention is thin and has uniform thickness in the direction of the movement, which prevents the formation of wind waves, and the liquid's surface is smooth in the direction of flow, and tense, which results from the fact that it is divided into elongated segments, convex in the direction of the coating, with a very small curvature radius, from several micrometers to nanometers. Such smooth ridges, stiffened by the high surface tension of water, do not permit the liquid meniscus table to be deformed or hydrodynamic instabilities to be created.

The essence of the solution according to this invention is that the coating has the surface with a fractal structure of hierarchic structure wherein the forms of the first hierarchic level are located next to the coating substrate and the forms of each successive level are located on the surface of forms of the previous hierarchic level and the shape of forms of higher hierarchic levels reiterate the shapes of lower hierarchical levels and the structure contains forms of at least two hierarchical grooves and ridges; also, the surface has anisotropic geometry, maximally developed in the direction transverse to the flow and with two gas passages located in the coating's substrate.

The solution according to this invention can have many variants and combinations that are specified below:

The coating can have a monolithic structure wherein fractal grooves and ridges are located directly on the surface of the material's layer:

The coating can have a porous substrate with interconnected pores.

The coating can have a uniform substrate with interconnected channels.

The coating can have grooves and ridges determining an omega-shaped contour of the coating's cross section.

The coating can have grooves and ridges determining a sinusoidal contour of the coating's cross section.

The coating can have grooves and ridges determining a steplike contour of the coating's cross section The coating can have a semi-openwork structure wherein fractal grooves and ridges are located in fibres supported by the coating's substrate.

The coating can have a semi-openwork structure wherein fractal grooves and ridges are located in bundles of fibres supported by the coating's substrate.

The coating can have fibres linearly supported by the substrate.

The coating can have an openwork structure wherein fractal grooves and ridges are located in hairs attached by their ends in coating's substrate.

The coating can have hairs attached by both ends in the coating's substrate, thus determining loops.

The coating can have hairs with flexible inserts.

The coating can have hairs with a woven layer structure.

The coating can have a woven layer with parallel weave.

The principal advantage resulting from the use of the invention lies in a dramatic reduction of the fluid friction resistance compared to relevant systems known and applied so far.

The invention can be applied in all those situations where a solid and liquid surface move relative to each other and where it is vital to reduce the resistance of that movement to increase the speed and/or reduce the energy expenditure. Furthermore, the superhydrophobic coatings described above prevent cavitation and the formation of build-ups, encrustations or pits on bodies submerged in water, which should extend their lifetime.

BRIEF DESCRIPTION OF THE DRAWINGS

The solution in accordance with this invention is explained in exemplary embodiments presented in the enclosed drawings, where individual figures present the coatings to drawn to scale and with approximate dimensions, with a side length of about 100 micrometers.

DESCRIPTION OF THE EMBODIMENTS OF THE INVENTION

Figure 1:
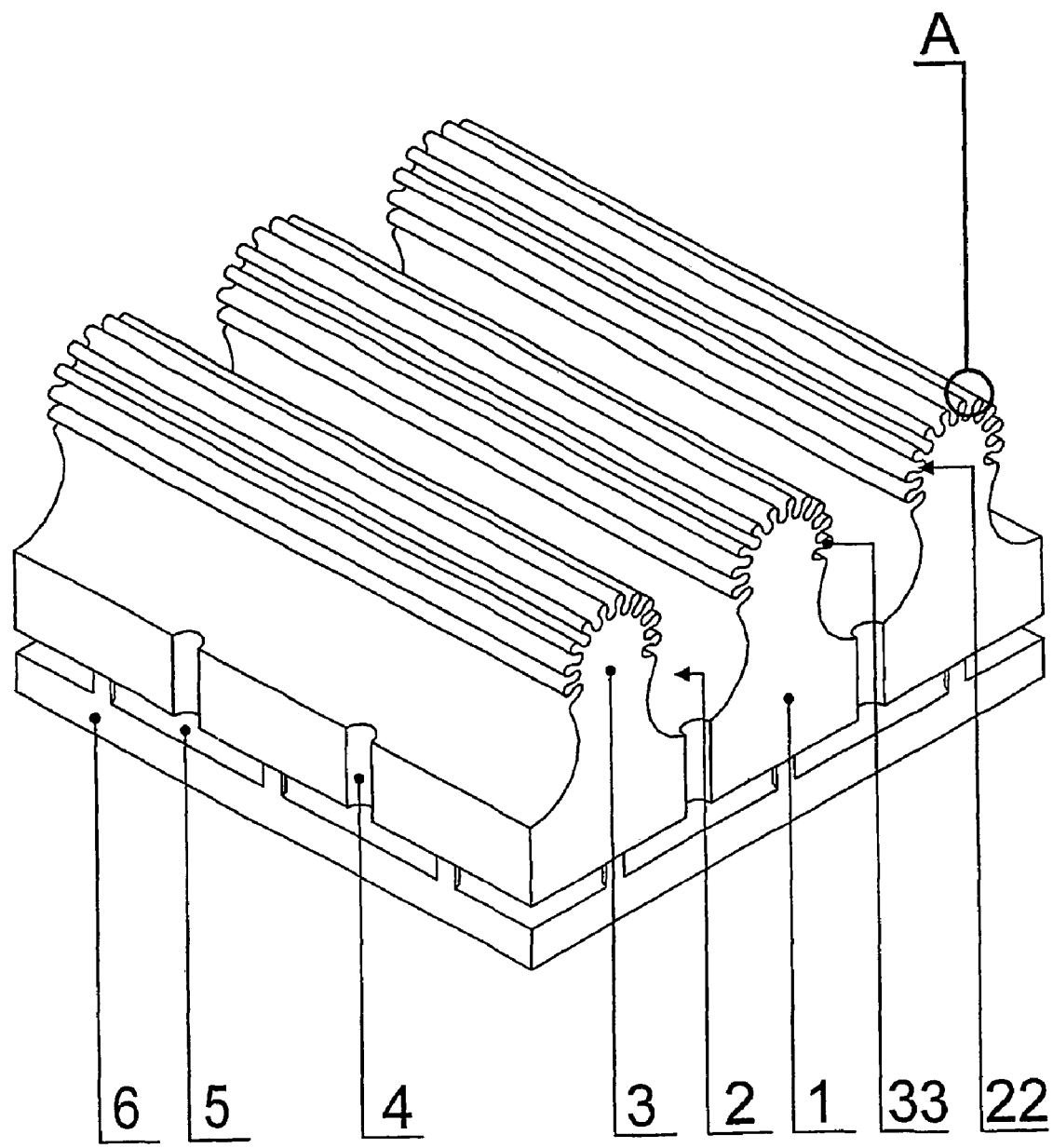
FIG. 1—A section of a fractal, linear anisotropic monolithic coating in exemplary embodiment with an omega-shaped cross section, with a solid substrate with microchannels and an air gap between the bottom layer and the substrate, FIG. 2—A section of a fractal, linear anisotropic monolithic coating in exemplary embodiment with an omega-shaped cross section, with solid substrate with micropores and an air gap between the bottom layer and the substrate, FIG. 3—Enlarged detail A presented in FIGS. 1 and 2, showing an individual ridge constituting an element of the coating surface, composed of a number of individual grooves and ridges with sub-micron cross-section, which reiterates in a smaller scale the same hierarchic pattern, FIG. 4—A section of a fractal, linear anisotropic semi-openwork coating in exemplary embodiment with a solid substrate with microchannels and an air gap between the bottom layer and the substrate, FIG. 5—A section of a fractal, linear anisotropic semi-openwork coating in exemplary embodiment with a solid substrate with micropores and an air gap between the bottom layer and the substrate, FIG. 6—Enlarged detail of a single element B1 determining the outside surface of the fractal variant of a semi-openwork or openwork coating with a star-shaped cross section, reiterating the same hierarchic pattern in a smaller scale, FIG. 7—Enlarged detail of a single element B2 determining the outside surface of the fractal variant of a semi-openwork or openwork coating composed of numerous elementary fibres with a star-shaped cross section with sub-micron "rays" bound to a cylindrical core, reiterating the same hierarchic pattern in a smaller scale, FIG. 8—Enlarged detail of the fractal, linear anisotropic coating with a hybrid, lamellar, sandwich-type, microchannel substrate, composed of two materials, one forming grooves and the other one ridges, supported by columns, and having an air gap between the between the bottom layer and the substrate, FIG. 9—Enlarged detail C as shown in FIG. 8, showing an individual ridge with a rectangular cross section, determining the surface of the linear projection on the coating, composed of elementary ridges, reiterating the same hierarchic pattern in a smaller scale, FIG. 10—A section of a fractal, linear, anisotropic, openwork coating in the exemplary embodiment with parallel fibres or bundles of bound fibres connected by means of pointwise-mounted supports with the solid substrate with microchannels, having an air gap between the between the bottom layer and the substrate, FIG. 11—A section of a fractal, linear, anisotropic, openwork coating in the exemplary embodiment with parallel fibres or bundles of bound fibres connected by means of pointwise spacers/support elements with the solid substrate with micropores, having an air gap between the between the bottom layer and the substrate, FIG. 12—A section of a fractal, linear, anisotropic, openwork coating with parallel fibres with a star-shaped cross section or bundles of bound fibres connected by means of continuous spacers/support elements with the solid substrate, having an air gap between the between the bottom layer and the substrate, FIG. 13—A section of a fractal, linear, anisotropic, openwork coating with parallel fibres with a star-shaped cross section or bundles of bound fibres connected by means of continuous transverse spacers/support elements with the solid substrate with micropores, having an air gap between the between the bottom layer and the substrate, FIG. 14—A section of a fractal, linear, anisotropic, openwork coating with an outside cover of hairs composed of parallel fibres with a star-shaped cross section or bundles of bound fibres connected in a pointwise fashion with the solid substrate with microchannels, having an air gap between the between the bottom layer and the substrate, FIG. 15—A section of a fractal, linear, anisotropic, openwork coating with an outside cover of hairs composed of parallel fibres with a star-shaped cross section or bundles of bound fibres connected in a pointwise fashion with the microporous substrate, having an air gap between the between the bottom layer and the substrate, FIG. 16—An individual hair made of a simple fibre or a bundle of fibres composed in a fractal fashion, bound pointwise with the coating's substrate, FIG. 17—An individual hair of another variant, flexible in the plane parallel to the coating, always orienting parallel to a local stream line, bound pointwise to the coating's substrate, FIG. 18—An individual hair in perspective view I—I as marked in FIG. 17, FIG. 19—An individual hair in perspective view II—II as marked in FIG. 17, FIG. 20—A section of a fractal, linear, anisotropic, openwork coating with an outside cover composed of loops of hairs, with a substrate with microchannels, having an air gap between the between the bottom layer and the substrate, FIG. 21—A section of a fractal, linear, anisotropic, openwork coating with an outside cover composed of loops of hairs, with a substrate with micropores, having an air gap between the between the bottom layer and the substrate, FIG. 22—A section of a fractal, linear, anisotropic, openwork coating with an outside cover of hairs in the form of woven loops, with a substrate with microchannels, having an air gap between the between the bottom layer and the substrate, FIG. 23—A section of a fractal, linear, anisotropic, openwork coating with an outside cover of hairs in the form of woven loops, with a substrate with micropores, having an air gap between the between the bottom layer and the substrate, FIG. 24—Types of Jacquard weaves, FIG. 25—A block diagram showing complex morphology and dynamics of the water table (surface) under the gaseous cushion, FIG. 26—a block diagram presenting the morphology of the steady, anisotropic and static in time morphology of the water table (surface) over the gaseous film present over the anisotropic linear monolithic surface made in accordance with his invention.
Figure 2:
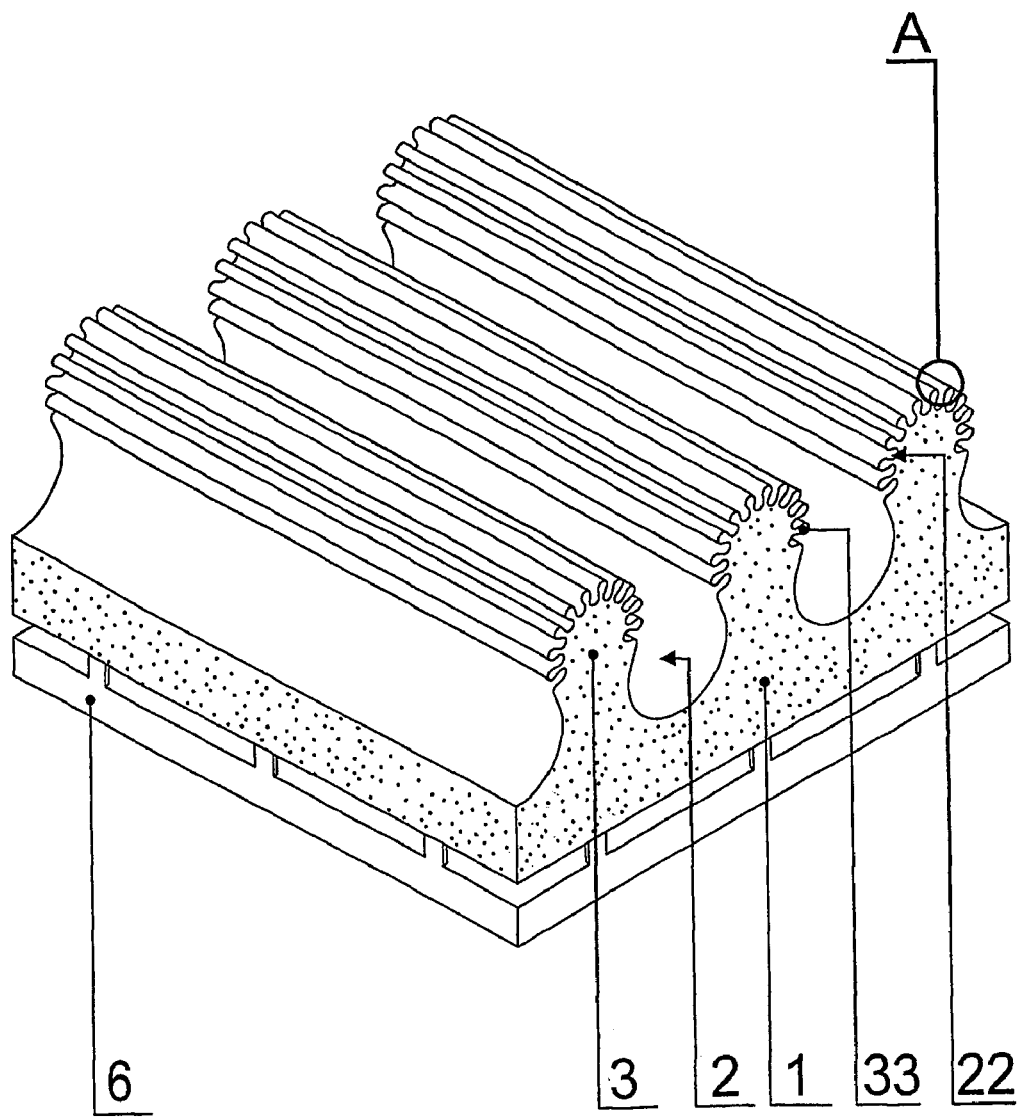

The coating in accordance with the present invention can be made in a monolithic, semi-openwork, and openwork variants.

Monolithic coatings are entirely made of solid or porous, yet bound into one lump of material. On the material's outside surface 1, there are fractal grooves 2 and ridges 3, whose cross section determines and omega-shaped line (as in the example shown in FIGS. 1 through 5), a regular zigzag, a high-amplitude sinusoid or rectangular bars (as shown in the example in FIG. 8). Facades of their first-level forms, spaced at distances not greater than 30 micrometers, are covered with grooves 22 and ridges 33 with cross sections of similar shape but of much smaller size, ranging from hundreds to tens of nanometers, and the latter are covered with another row of the finest, linear forms with a size of several nanometers, which are not shown in the figure.

The material's layer 1 is connected through channels 4 with gap 5 located under the substrate 6.

Figure 8:
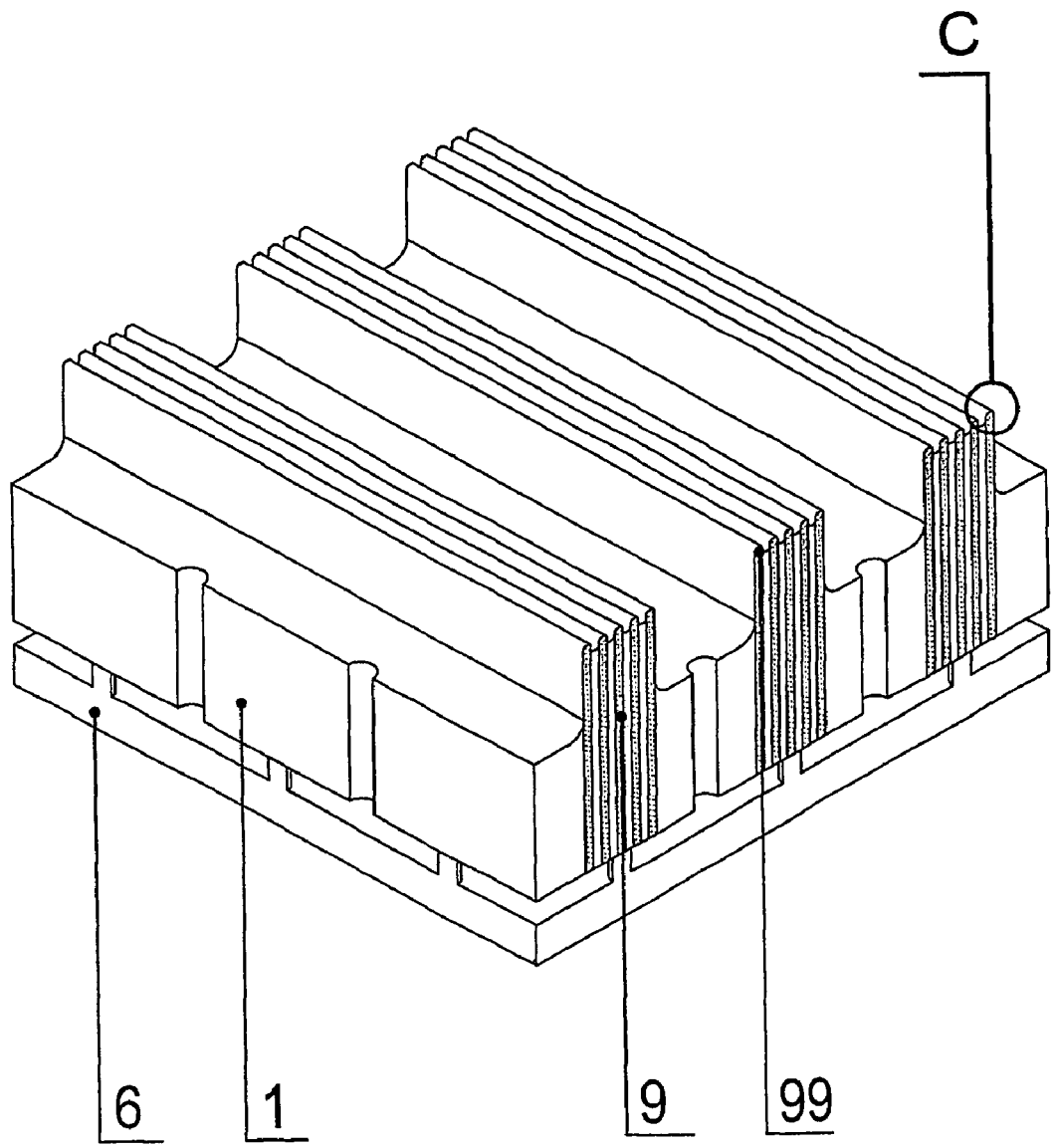
Figure 9:
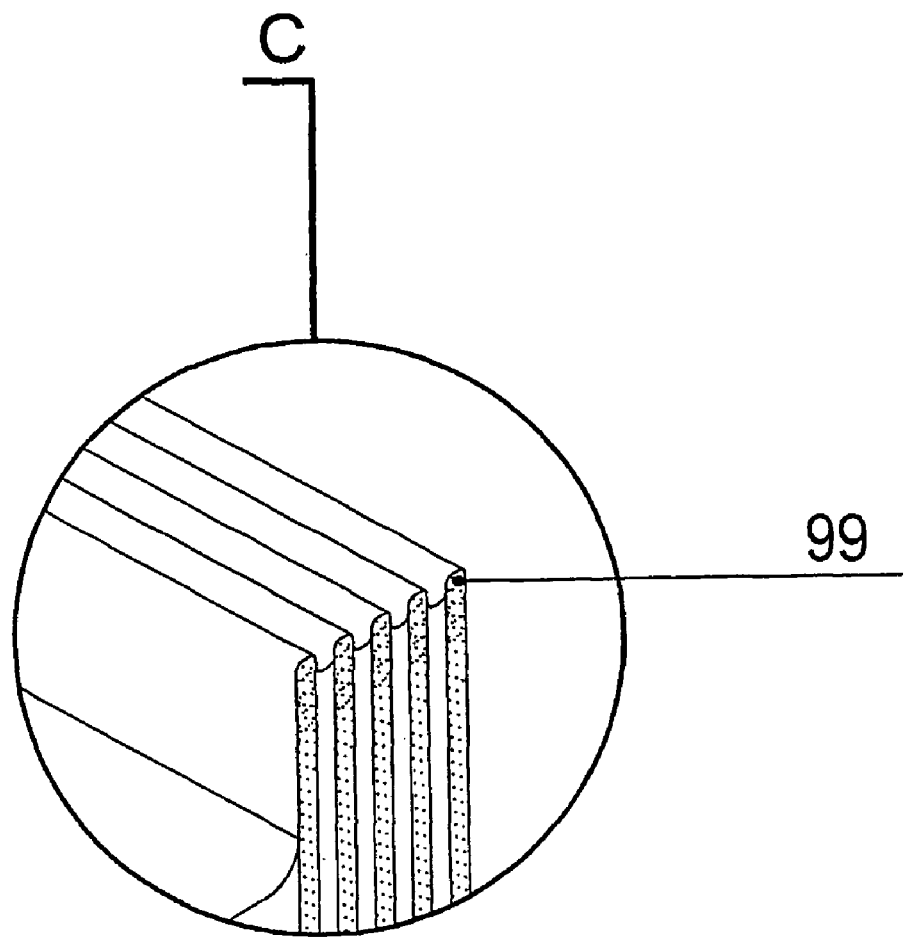
Figure 10:
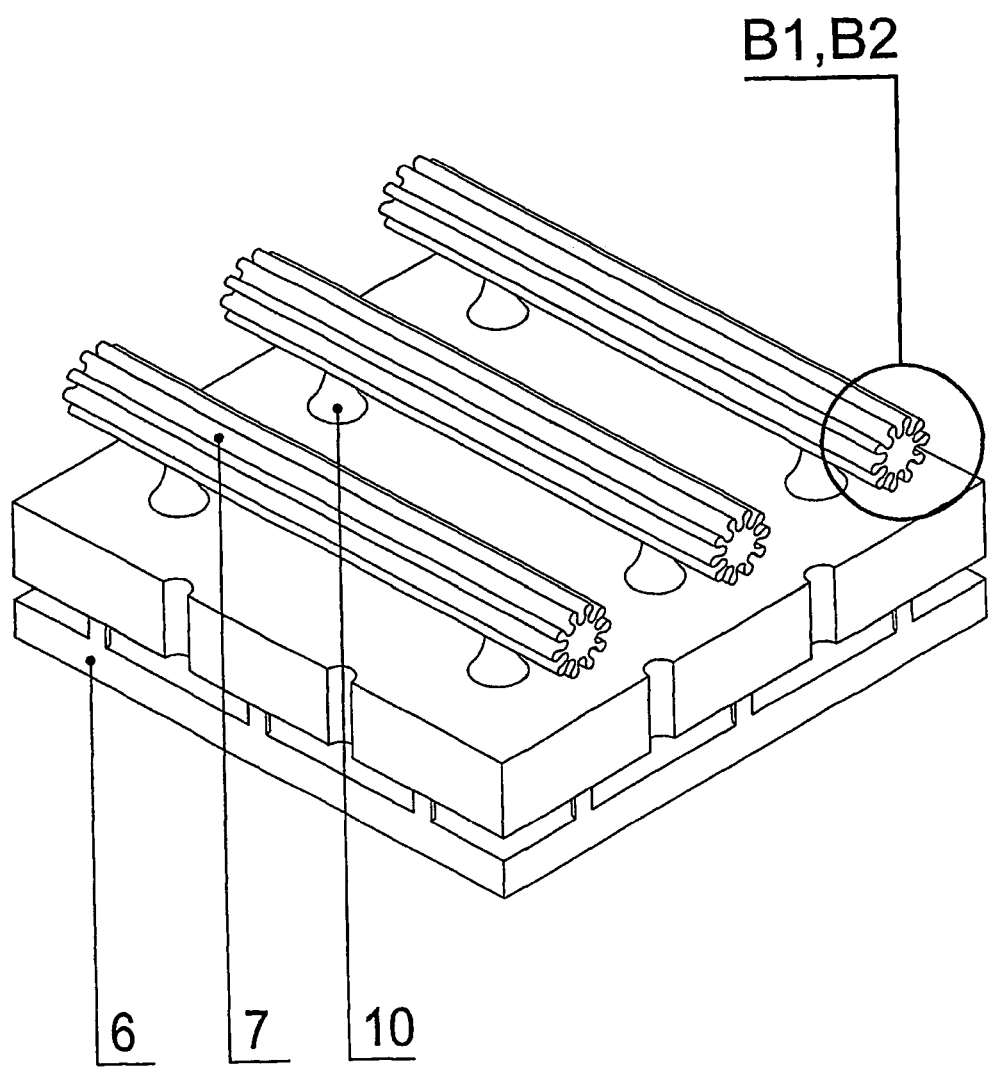
Figure 11:
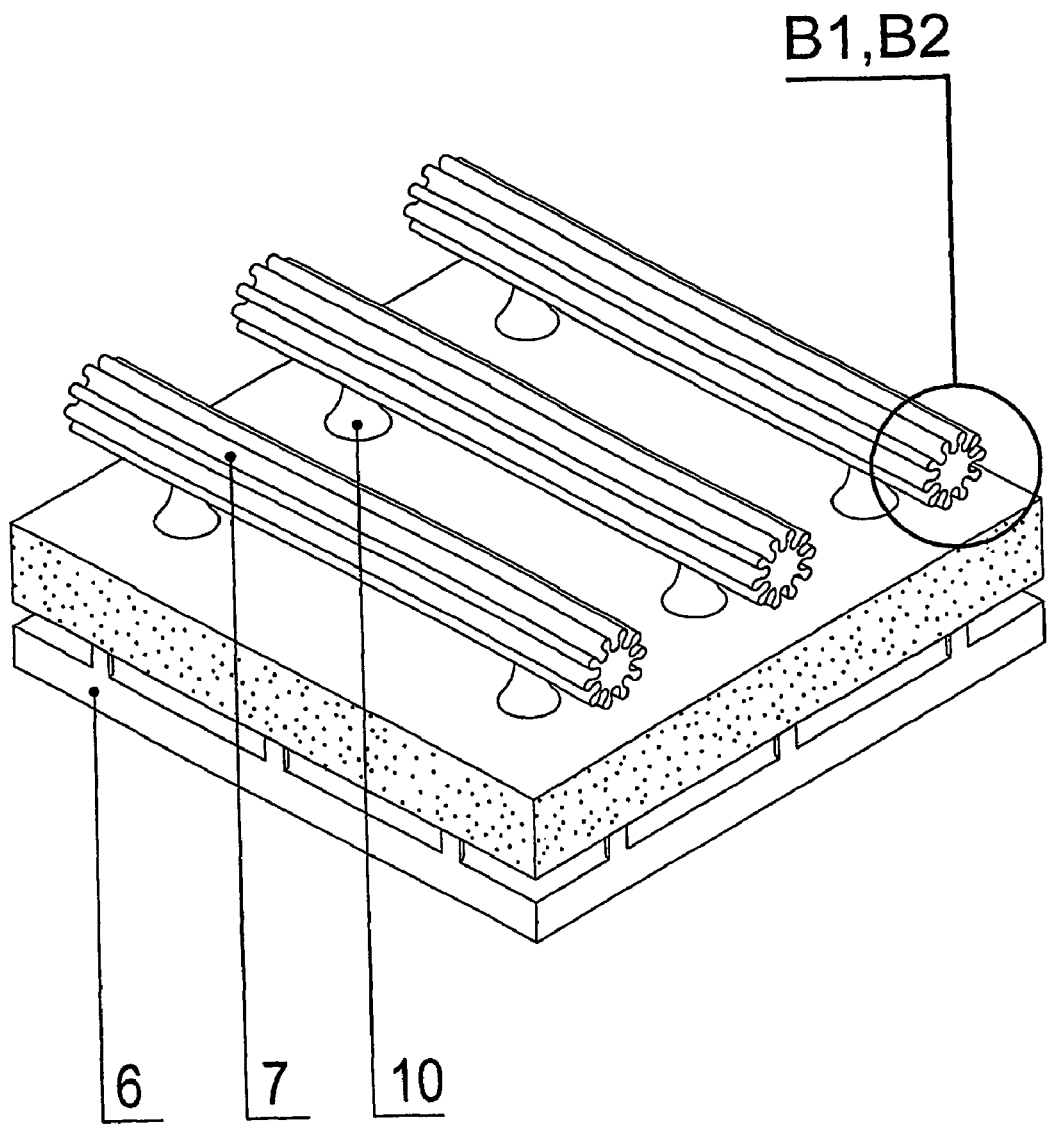
Figure 12:
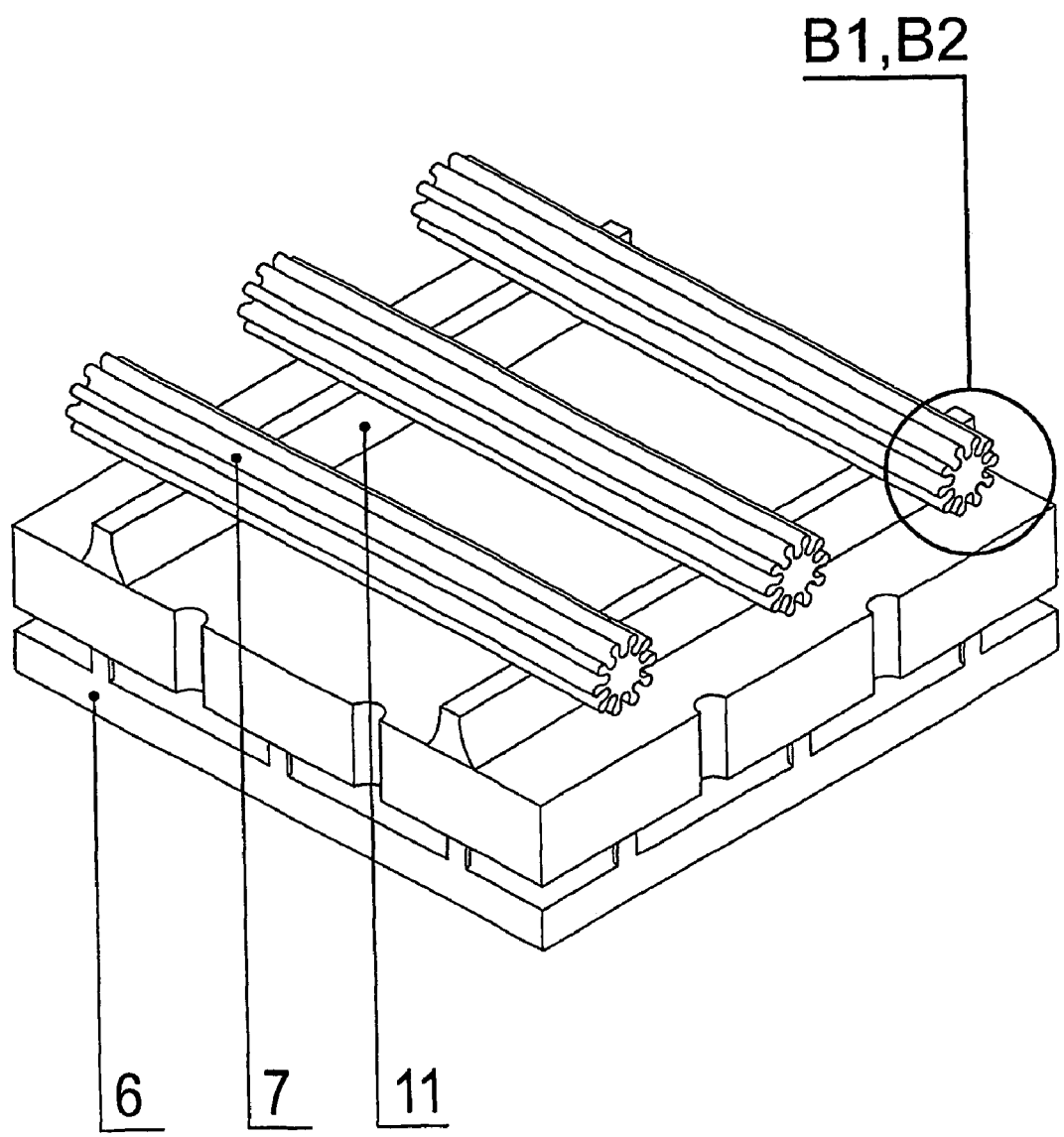
Figure 13:
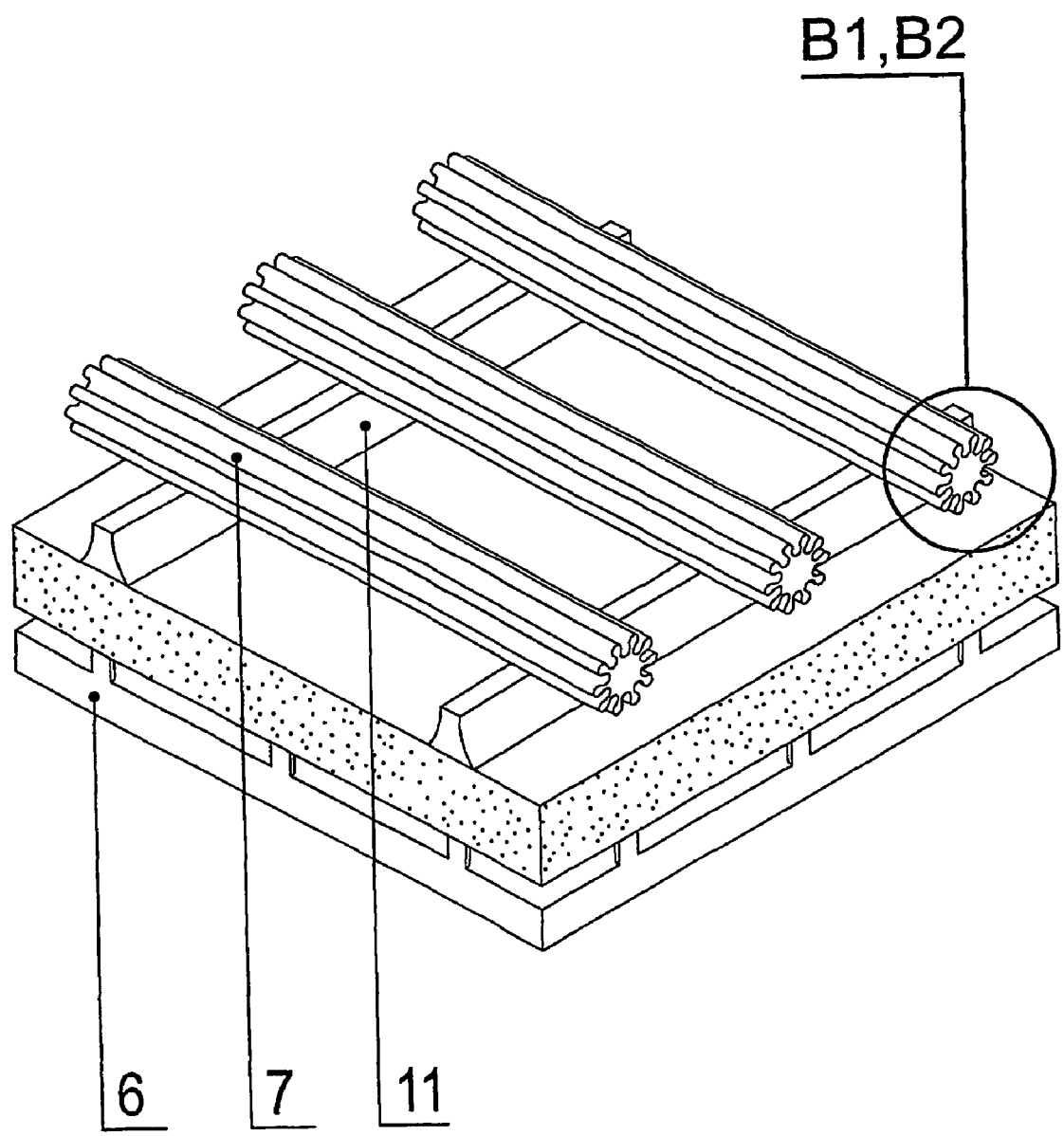

Monolithic structures are best suited to be applied in environments where they are particularly susceptible to mechanical damage. Coatings most appropriate in such conditions are those capable of self-repair. Such monolithic coatings made in accordance with this invention will be composed of stacks of thin layers of materials (laminates) oriented perpendicular to the coating's surface. A stack with fractal, hierarchical pattern of changes in thickness, composed, for instance, alternately of layers resistant and less resistant to abrasion or having various solubility in selected solvents different substances, as shown in FIG. 8. It is composed, as can be seen in the cross-section, of a hierarchical system of rectangular columns 99 of the second level, reiterating the same shape in a smaller scale. The repair involves grinding and polishing of damaged places and subsequent grinding by sand blasting or the action of ultrasonic waves after covering the surface with fine grained abrasive suspension, or by etching with an appropriate chemical reagent. As a result of selective abrasion the surfaces relief can be spontaneously precisely reproduced down to details of nanometer size.

Figure 3:
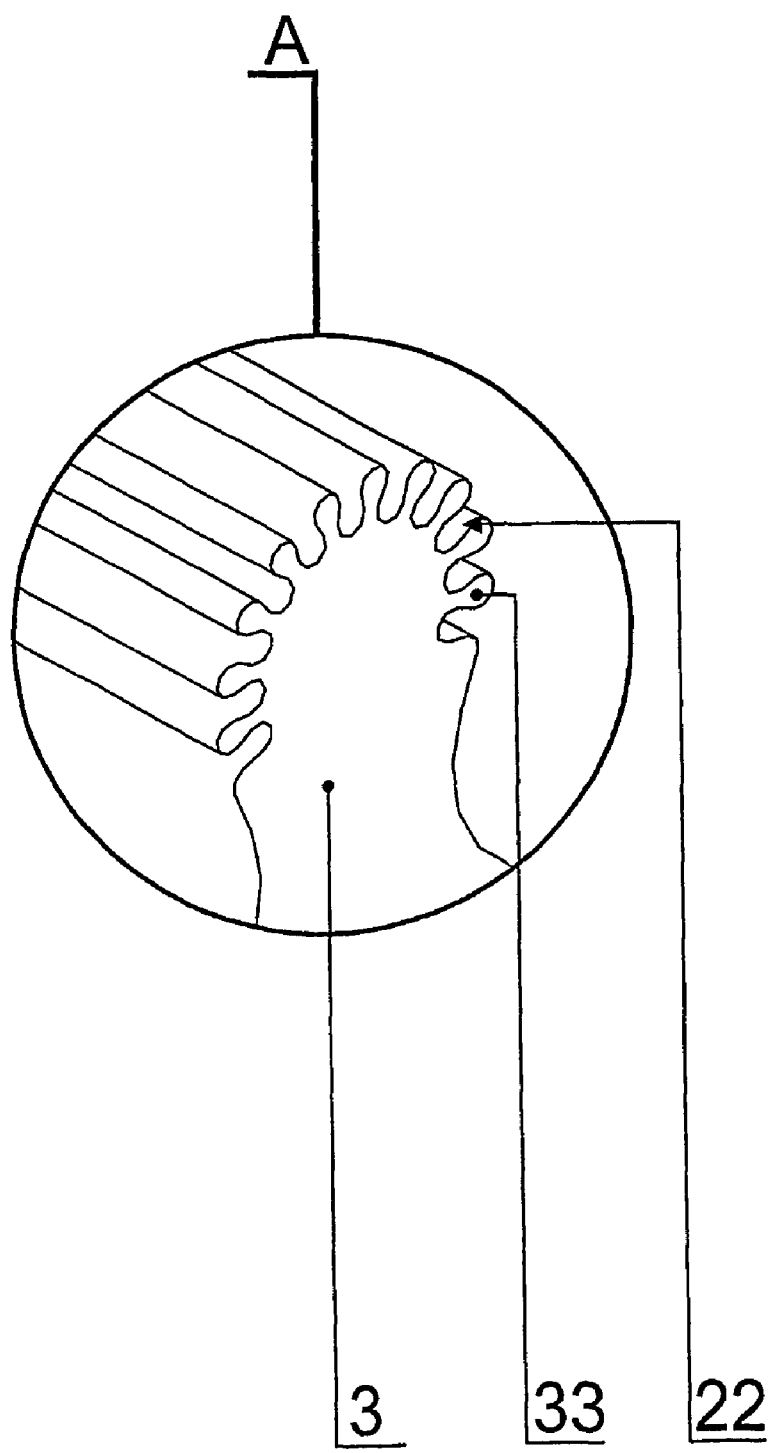
Figure 4:
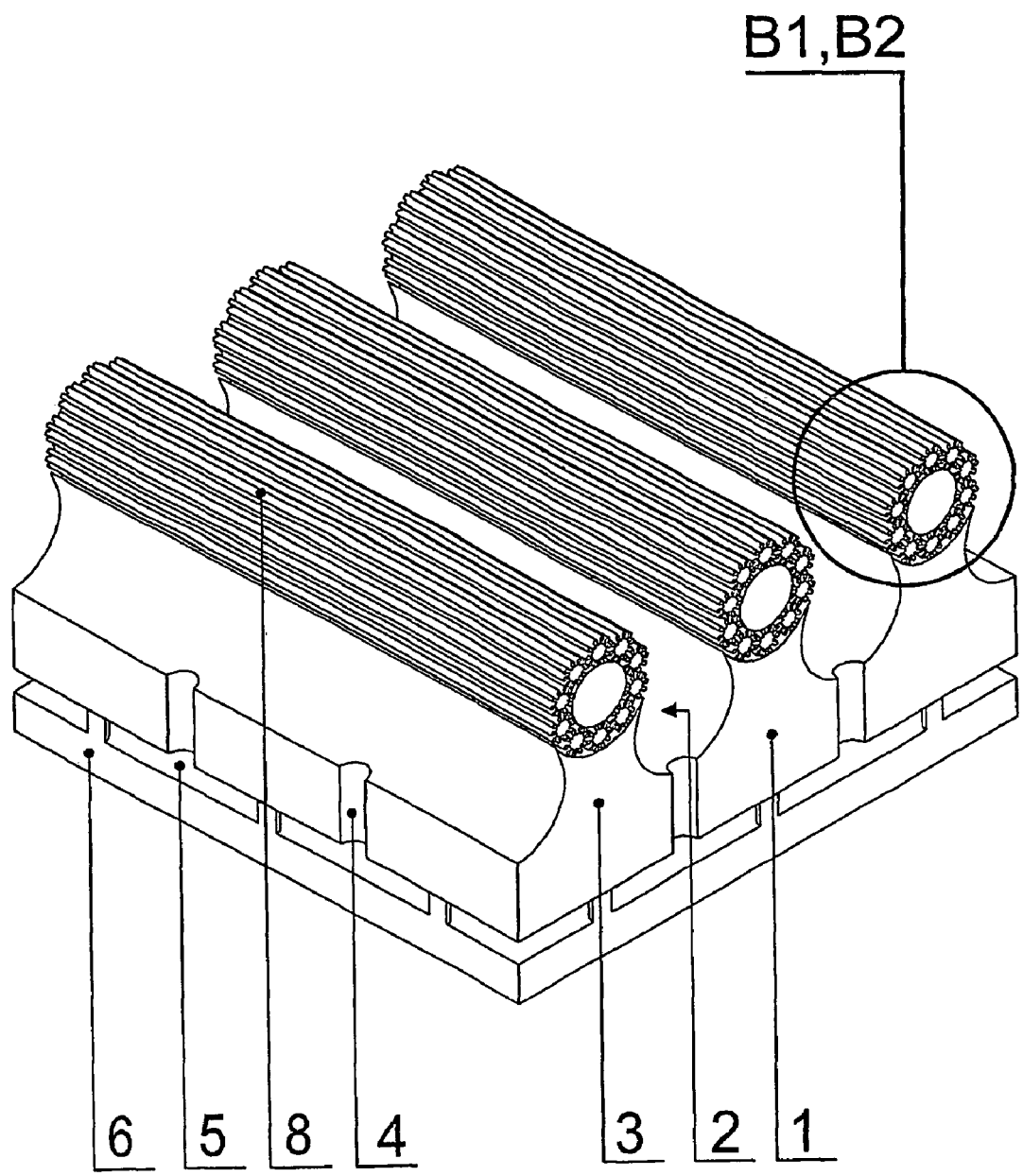
Figure 5:
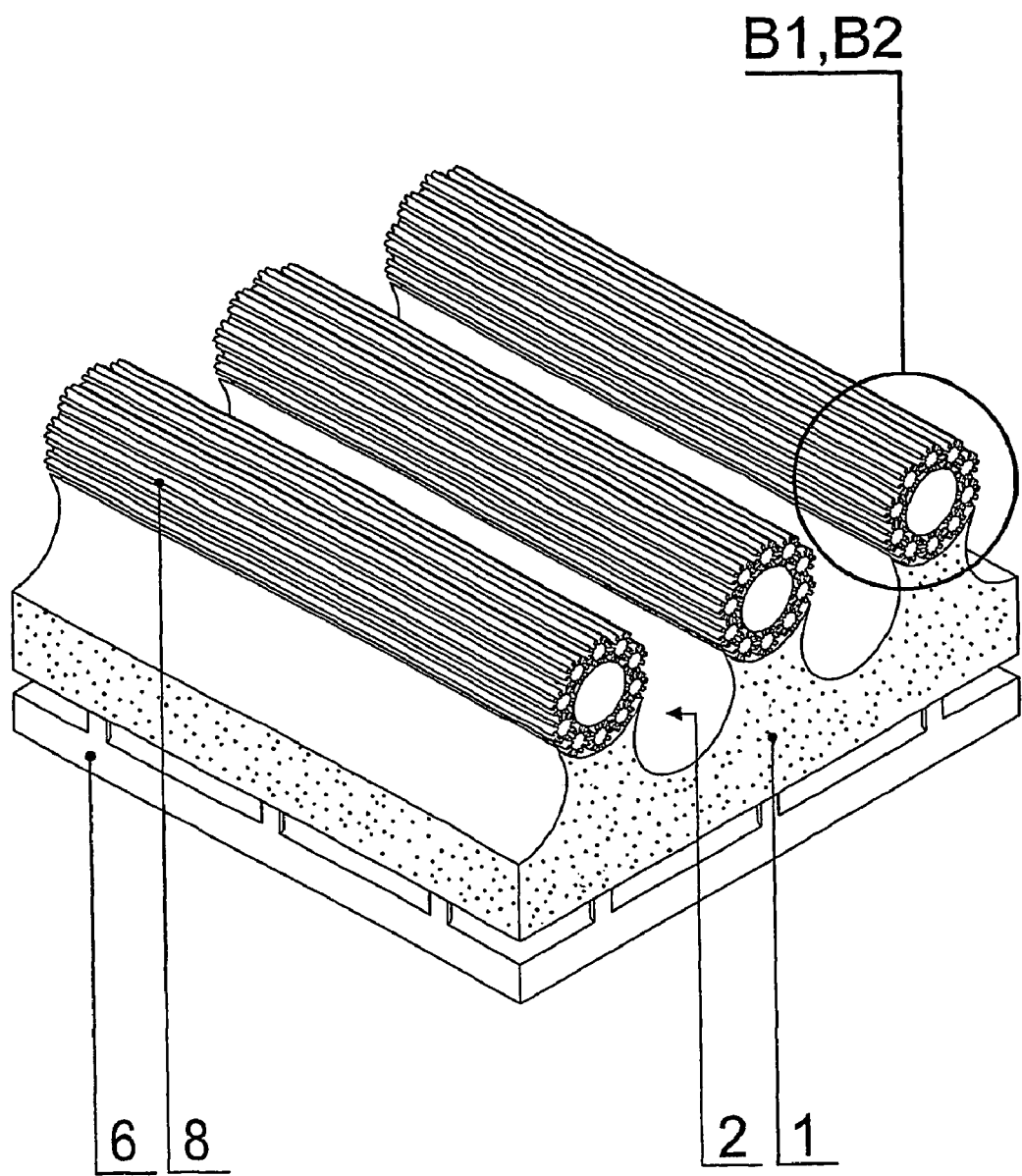
Figure 6:
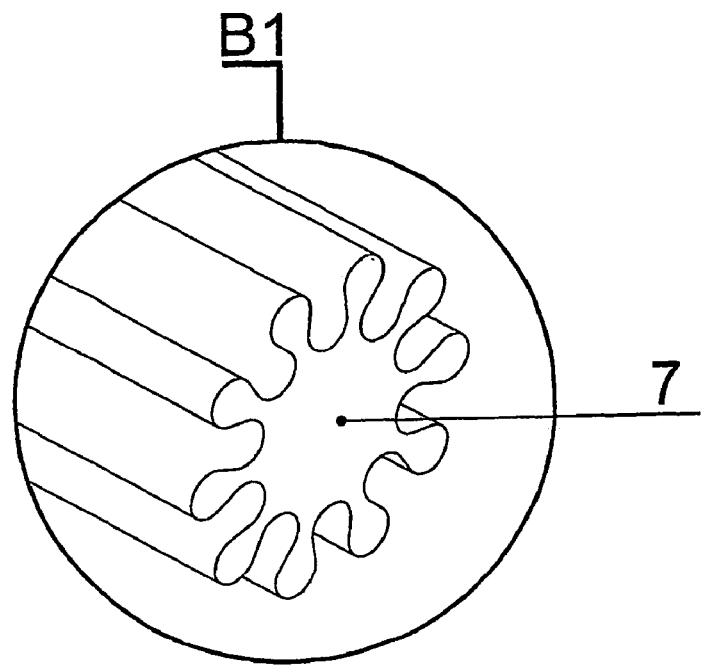
Figure 7:
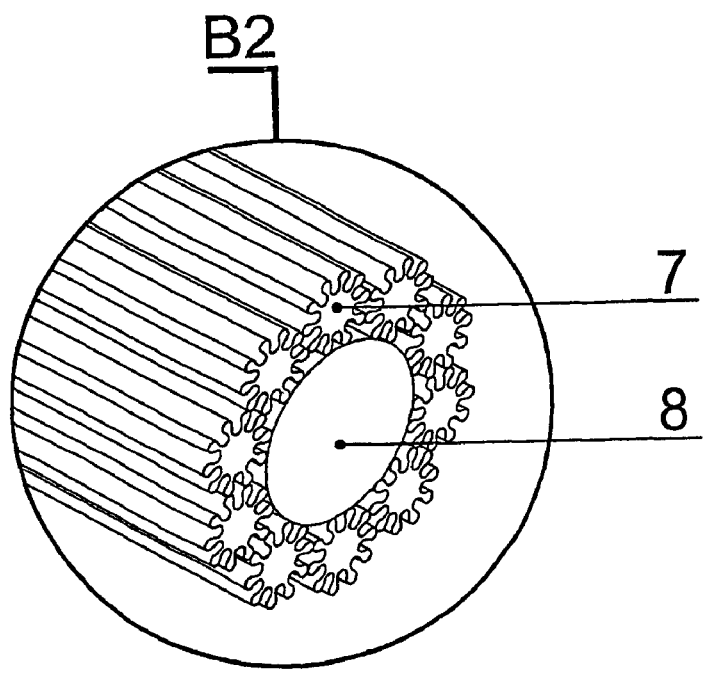

The semi-openwork coatings forming bands of parallel separate fibres with a star-shaped cross-section 7, or bundles 8 of fibres 7 connected with a core, in a fractal version, reiterating the same hierarchic pattern, which are bound with material's layer 1 over the entire length (FIGS. 3, 5).

In embodiments shown in FIGS. 10, 11, 12 and 13 the layer is composed of bands of individual fibres 7 with a star-shaped cross section, or bundles 8 of fibres connected with a core, bound with the material's layer 1 by pointwise supports 10 or continuous transverse supports 11.

Figure 14:
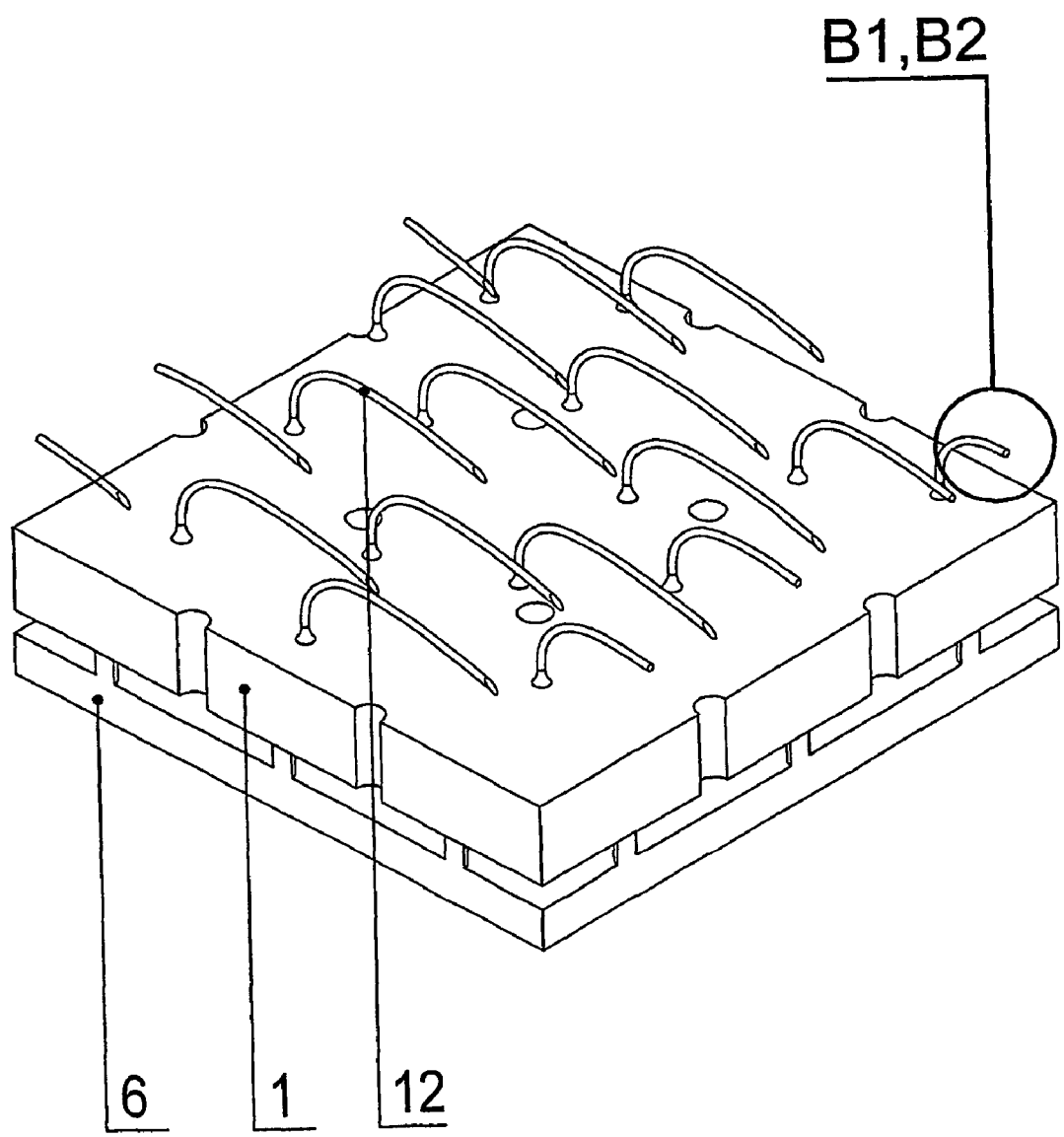
Figure 15:
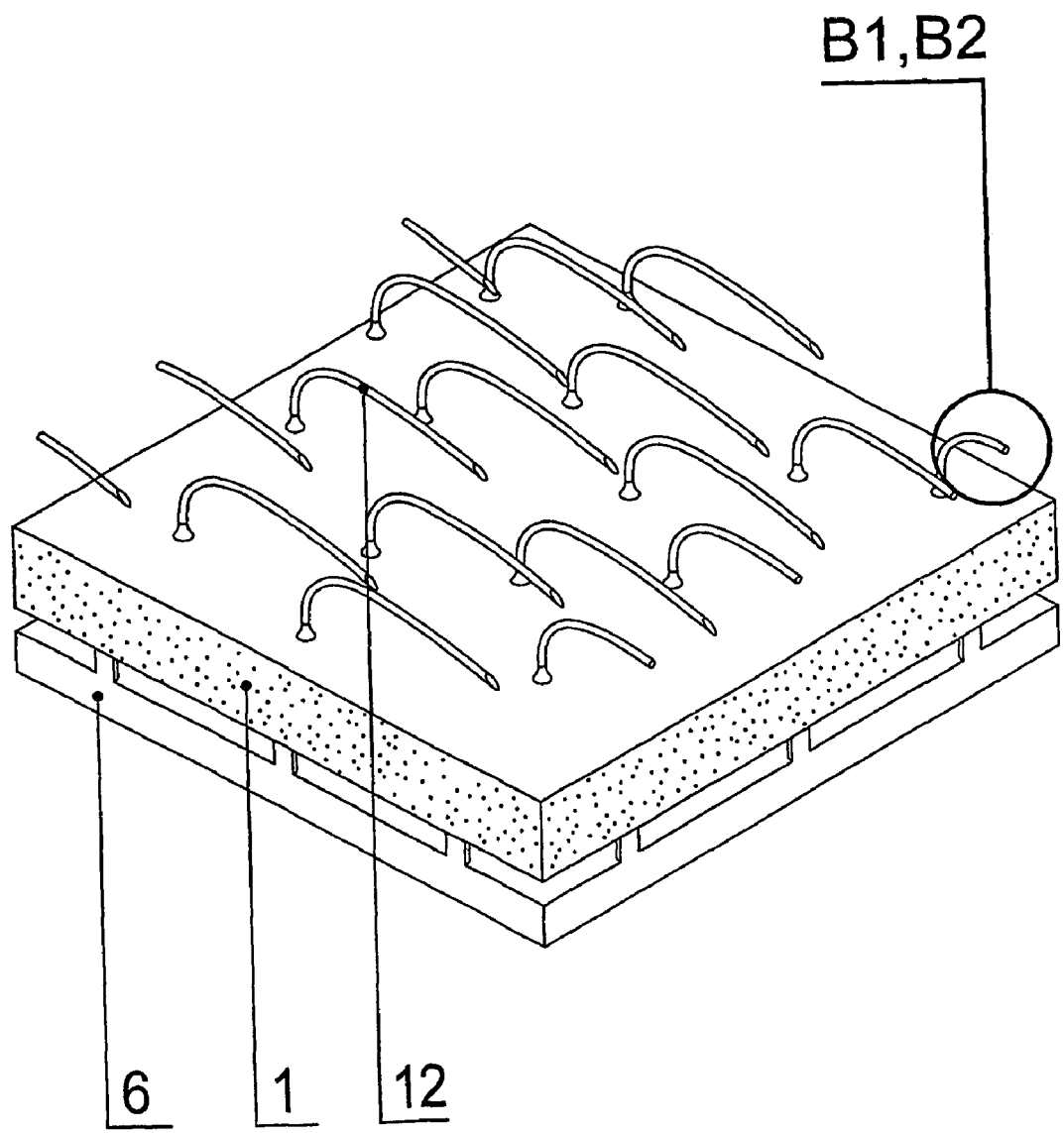

The most effective coatings as regards drag reduction are openwork ones. Such coatings are covered with hairs 12 parallel to each other and to the substrate. The hairs have the form of individual fibres 7 with a star-shaped cross section or composed of fractal bundles 8 of bound fibres of the same type with a round core, with a width to length ratio, preferably thicker at the base where they are bound to the material's layer 1, and perpendicular to it over a small section (FIGS. 14 and 15).

Figure 19:
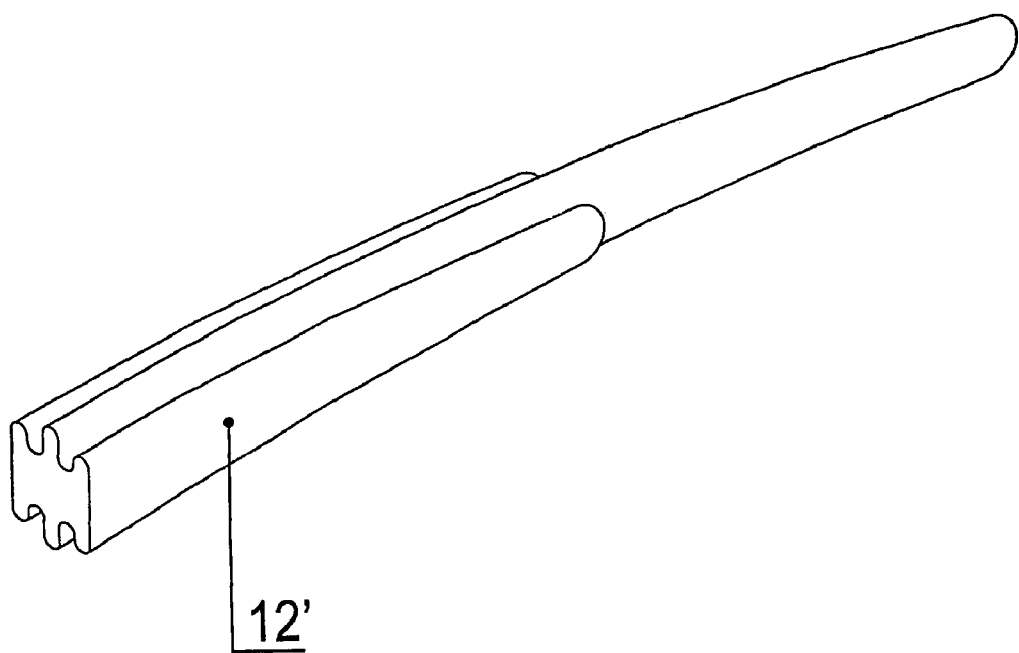

Such an element, resembling a flexible skid, deforms the water table in the least degree, transversely to the direction of flow. It is most advantageous from the hydrodynamic point of view, although most difficult technologically, to make hairs 12' become thinner over the length, with surface arrangement in the form uniformly spaced grooves and ridges with, invariably parallel to each other in planes perpendicular to the substrate in spite of decreasing hair diameter 12'. (FIG. 19). Such geometry prevents stream lines from being "squashed", prevents blocking the flow and development of turbulence of the liquid, which would develop in the liquid entering channels as they tend to narrow towards the end of a hair 12. Hairs 12, 12', attached by one end to the substrate, e.g., by means of electrostatic flocking—can—be densely scattered, at distances of ten to twenty micrometers, but they should not contact with each other.

Figure 16:
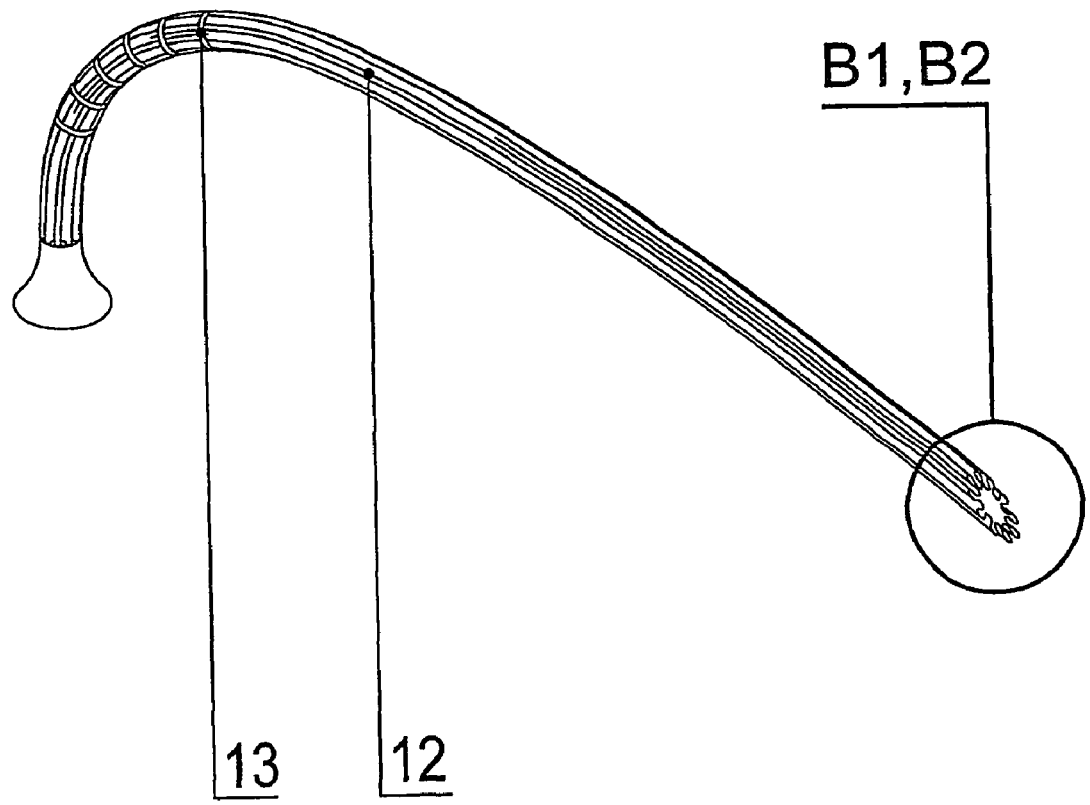
Figure 17:
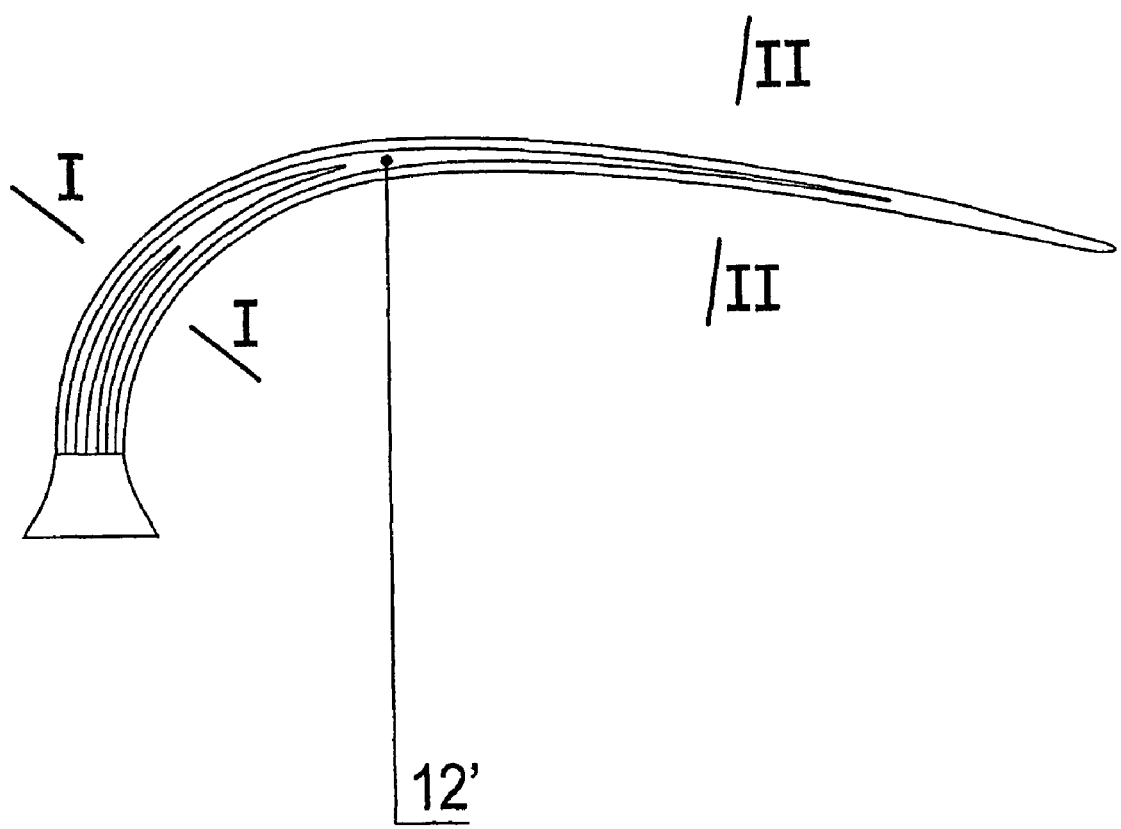
Figure 18:
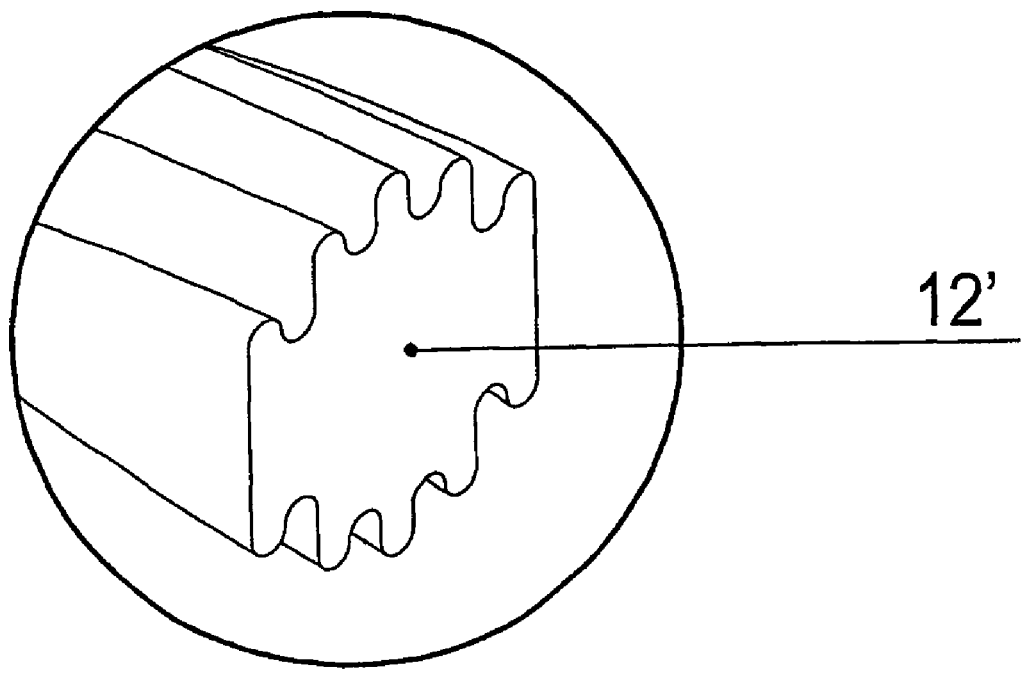
Figure 20:
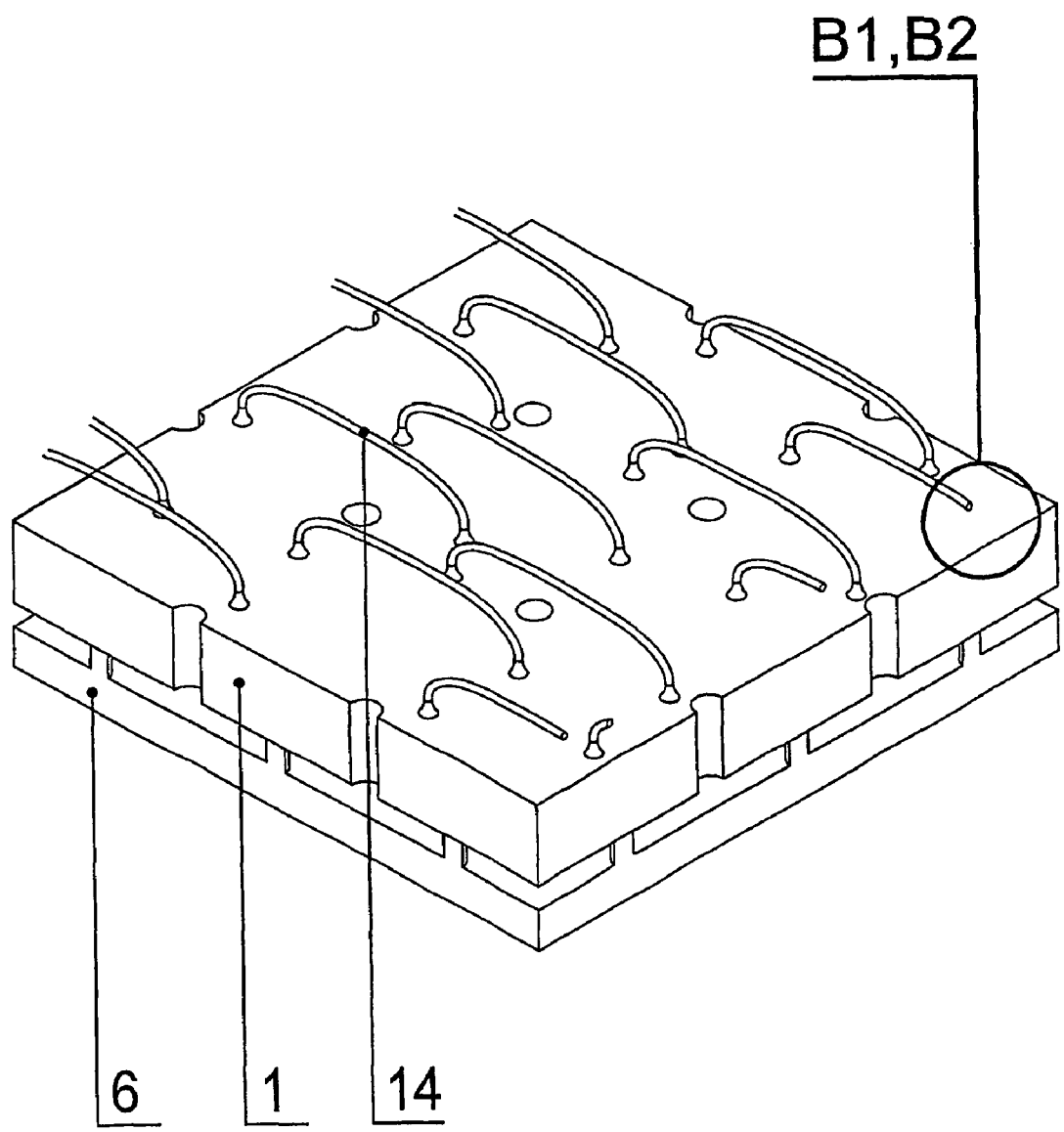
Figure 21:
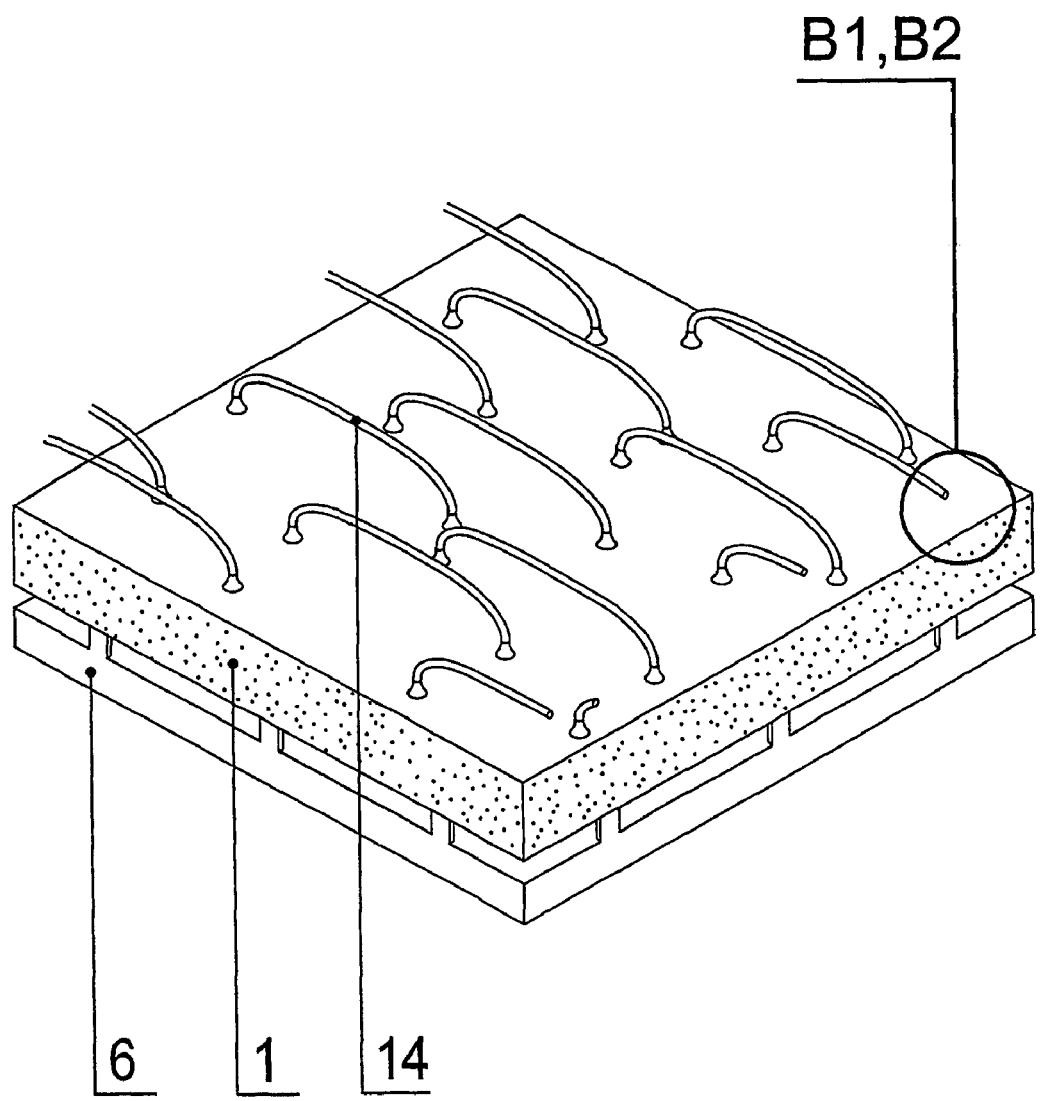

In particular, it is possible to use this method to make coatings adapt the direction of their anisotropy and, consequently, the direction of the least resistance, to the varying flow direction. There is thus a method of creating versatile coatings that surrender to stream lines transverse to the direction of a water vehicle, to be used under turbulent flow conditions, on stormy/troubled turbulent waters in mountain rivers. Such a result can be produced by drastically reducing the stiffness of the bend above the base of each hair 12, 12'. it is advisable to make that section of the fibre) as a geometrically continuous, although having a non-uniform internal rheological structure, composed of a number of thin, flexible inserts 13 made of flexible elastomer, interspaced with sections of stiffer material of which the rest of the hair 12, 12' is made. The very segmentation ensures full flexibility to the joint, but only in a definite angle range (FIG. 16). Having such a structure, each hair 12, 12' will orient themselves in conformity with a local stream line. The hairs 12, 12.1' can also be attached to the substrate by their both ends, in the form of pre-stressed loops (FIGS. 20 and 21), but such a solution, like the monolithic or semi-openwork version, is suited only to one direction of flow.

Figure 22:
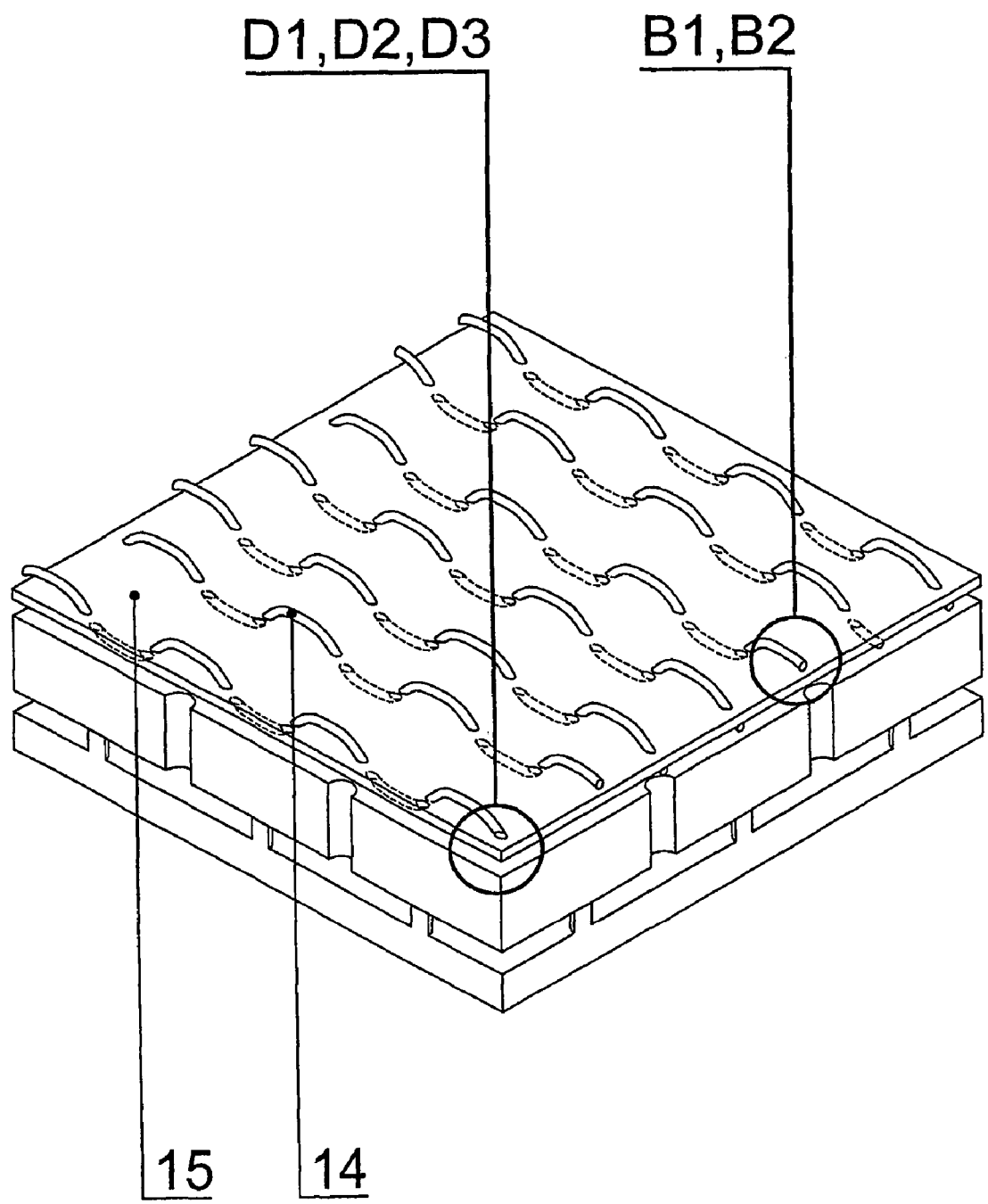
Figure 23:
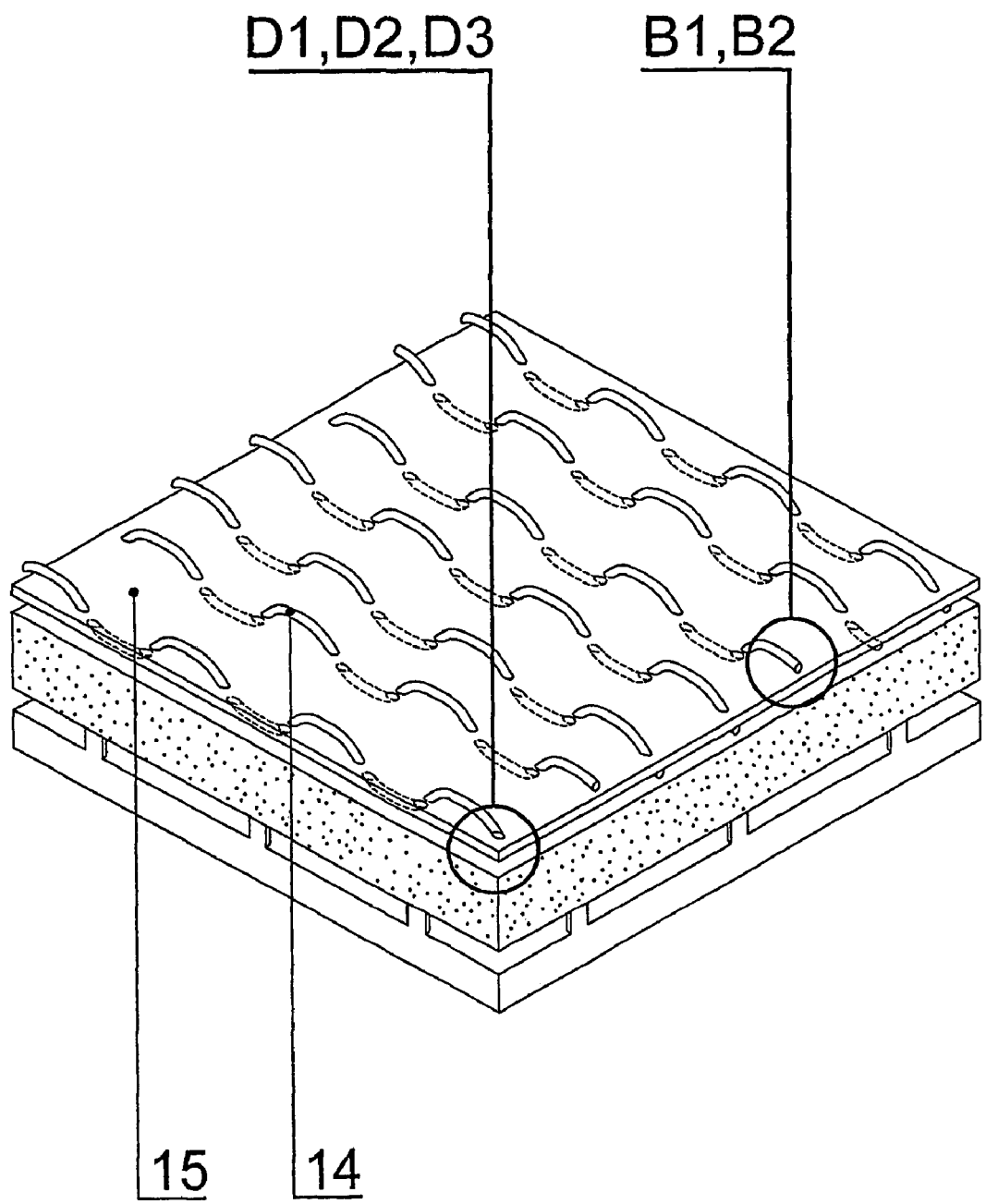
Figure 24:
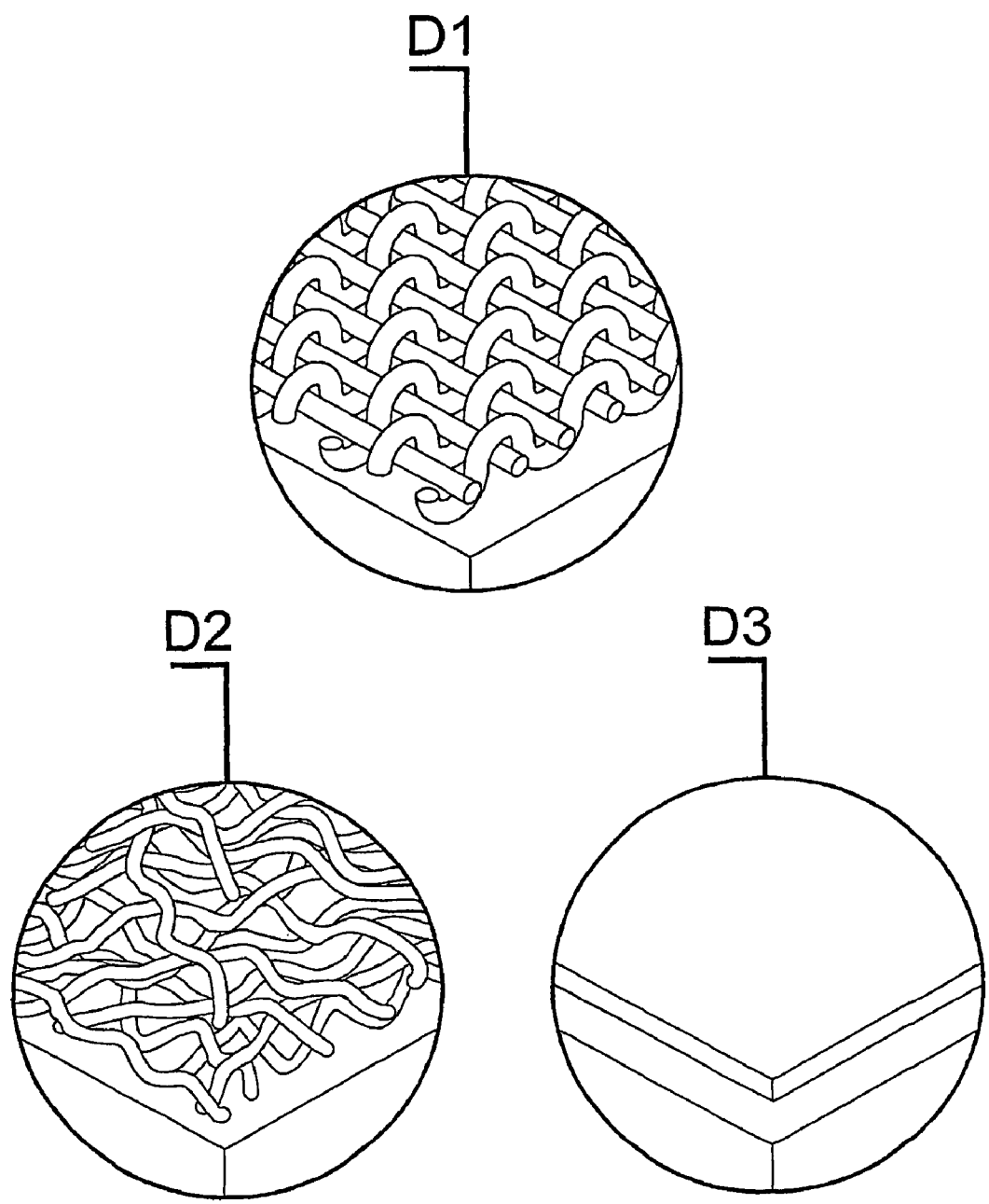

This embodiment can also have the form of a woven layer 15 (FIGS. 22 and 23). In contrast to regular Jacquard weaves composed of bands of fibres or threads wavy or twisted in a haphazard fashion, the woven layer 15 as proposed here will be made of separate, elementary or composite fibres (FIG. 24) piercing the substrate: a thick woven fabric, unwoven fabric or foil having a system of parallel weaves. A number of neighbouring elementary weaves can form transverse ridges which produce in the water table corresponding "negative" grooves transverse to the direction of movement and increasing the drag. That is why it is advantageous to make such a weave with a haphazard or regular shift of said elementary, identical parallel loops, as in satin, twill, or herringbone weave variants.

Two basic versions of the material's layer 1 are planned as possible alternatives to be used in all the monolithic, semi-openwork, and openwork systems described above. In the first embodiment it is planned to equip the substrate plate with a system of channels 4, drilled in regular intervals or spaced in a chaotic manner (FIGS. 1, 4, 8, 10, 12, 14, 20, 22).

In the second embodiment, the layer 1 has the form of a plate made of porous material with interconnected pores of micrometer size and with bare or additionally covered with a hydrophobic membrane, impermeable to liquids and easily permeable to gases, e.g., GoreTex® type membranes (FIGS. 2, 5, 11, 13, 15, 21, 23).

Another, thinner plate 6 is attached to layer 1 on the material's side by means of spacers/connectors: pins, columns, rivets, etc. The space between the two plates forms a gap 5 for the system distributing additional gas which, in some situations, is necessary for the proper functioning of the immersed superhydrophobic coating, although basically under steady-state conditions the gaseous film can form and be retained spontaneously by degassing and evaporating the liquid surrounding an extremely hydrophobic coating. The gas supplied to the coating's surface through a system of gaps 5 and channels 4 (compressed air or hydrogen having very low viscosity), which is needed in some extreme applications, balances the hydrostatic forces exerted by the liquid surrounding the immersed body. The pressure, which increases with depth, compresses and thus makes thinner the gaseous film. The supplied gas compensates for this decrease in volume and also makes up the losses of the gaseous film, which is dispersed and dissolved in the surrounding liquid, as well as scratched off during movement.

Proper selection of material for the coating affects markedly its durability and depends on the planned working environment. For pipelines transporting clean water, free of suspensions, the material's mechanical properties are not important; what matters is only its resistance to corrosion and that is why polymers are the optimal solution in this case. For surface and submarine vessels more suited are ceramic materials, glass, stainless steel, alloys resistant to seawater, titanium and selected polymers. In the case of small floating vessels such as canoes, surfing boards, or small yachts the surfaces resistance to impact, rubbing against the bottom and other floating objects and animals, gravel and sand on the beach, and abrasion due to loose material suspended in the water call for coating material of extreme mechanical properties, such as diamond, diamond-like graphite, silica carbide, corundum, composite materials and elastic materials with high abrasion resistance, such as some elastomers. It is also possible, as previously mentioned, to select the material and design the inner lamellar structure of the coating so as to give it the ability to self-reproduce, in spite of the abrasion of surface layers.

The selection of optimal agent to make the coating surface hydrophobic depends on many factors, yet primarily on the working environment and physicochemical compatibility (affinity) with the material of which a given coating is made. In the case of pipelines transporting clean water the entire coating can be made, for instance, of Teflon®, a highly hydrophobic, soft fluorine polymer, or its derivatives. Similarly diamond or silicon carbide are substances with natural hydrophobicity. If other materials are used as substrate for the coating we can choose from among numerous inorganic substances, primarily silanes or fluorinated polymers, such as trifluoromethylene and its derivatives, soluble in water or organic solvents, which, after evaporation of the latter, form a thin uniform membrane or one can use fluorinated chemically or thermally set resins. Some of their formulas are used to water-repellent various kinds of glass, ceramic materials or to materials of mineral origin—other substances are applied to polymers and metallic surfaces. Synthetic and natural waxes, whose earliest application was to waterproof fabrics to make them water resistant, are very soft substances, susceptible to abrasion, yet in some cases they can be applied to hydrophobise elements less exposed to mechanical wear.

One should be prepared for degradation of the hydrophobic chemical layer applied to the surface during its lengthy operation; it can happen by abrasion, chemical or photochemical decomposition; the surface can also be covered with dirt, oil derivatives, incrustating water organisms and deposits, in spite of the fact that a superhydrophobic surface has an inherent capacity for self-cleaning. In such a case the surface must be carefully cleaned to remove old layers of hydrophobic agent and deposits; it can be accomplished by washing with a high-pressure jet of solvent or a solution of surfactant and then uniformly re-coated with an appropriate substance.

Figure 25:
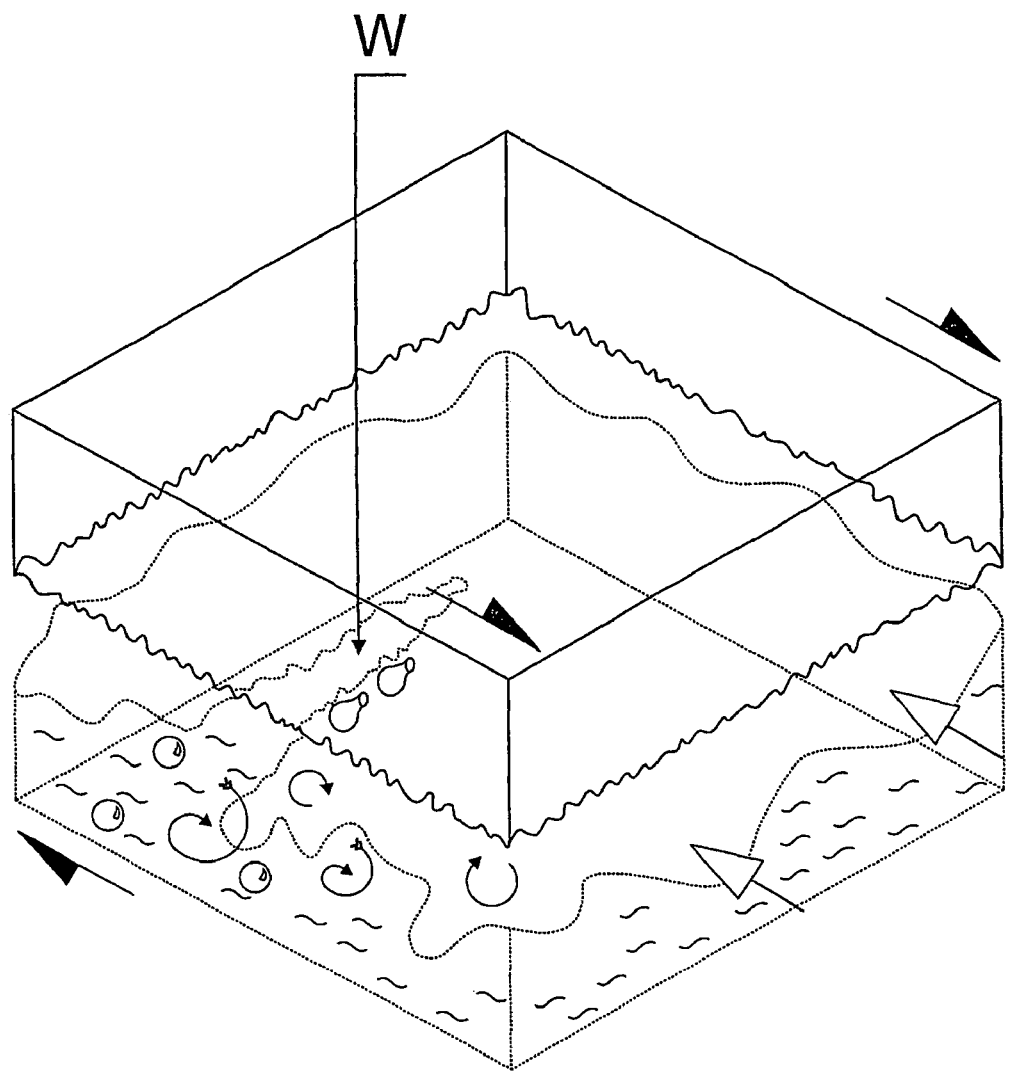

The block diagram (FIG. 25) shows a complex morphology and dynamics of water surface (table) under a gas cushion. In conventional technologies, the cushion is produced by forcing air in between the fractal superhydrophobic coating (for the sake of clarity, made transparent in the drawing) and the liquid surrounding the liquid.

Most important components are represented by the following symbols:

Q—a developing gas bubble, R—a gas bubble totally surrounded by the liquid, S—a turbulent vortex developing in water, T—a turbulent vortex developing in the gas, U—the direction of relative movement of the coating relative to the surrounding liquid, V—the air flowing in through the slot (located outside the area shown in the picture), W—the surface of a liquid bridge connecting the defective or locally damaged surface with the surrounding liquid.

Figure 26:
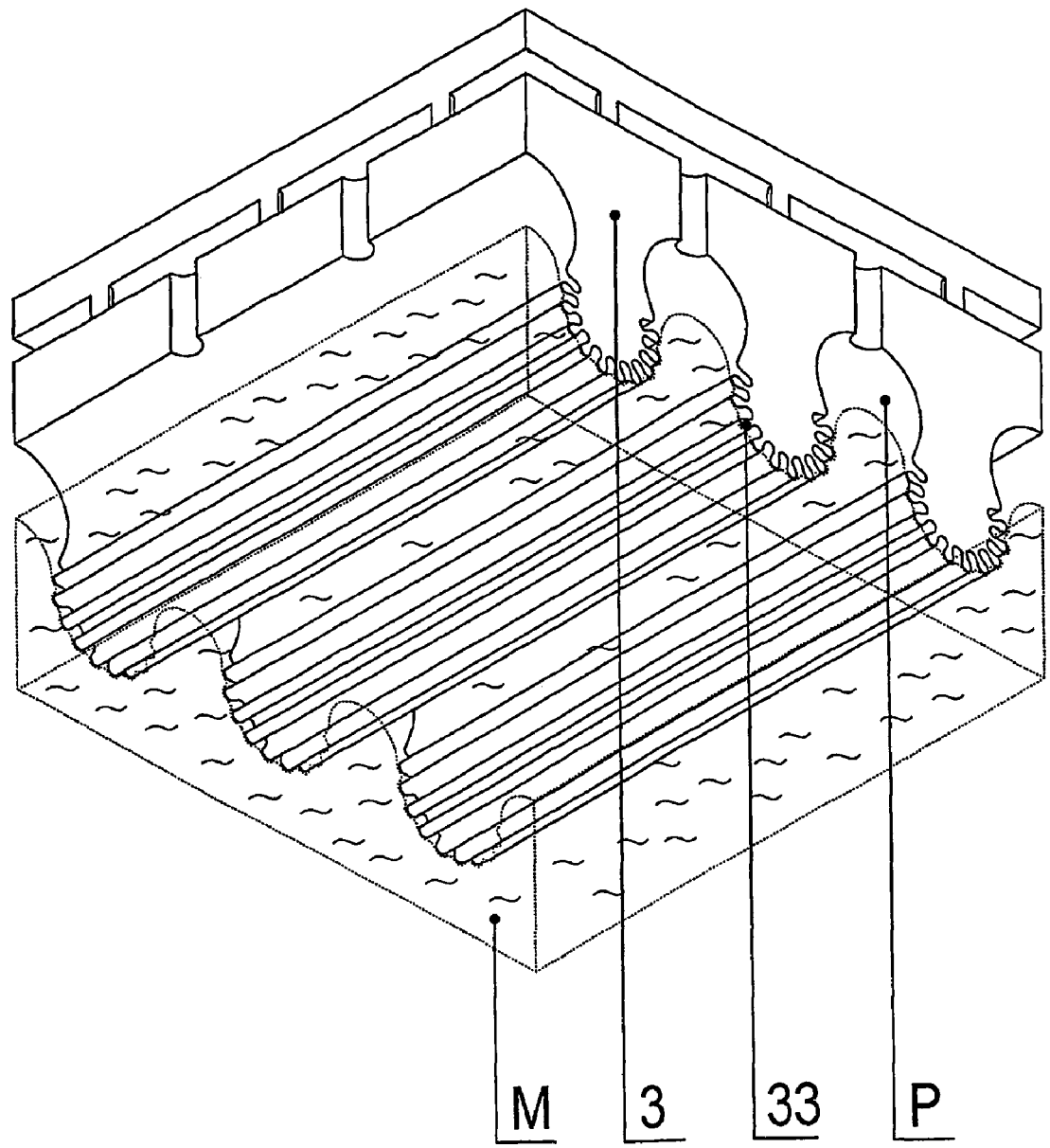

The block diagram (FIG. 26) shows a steady, anisotropic, static-over-time morphology of the water surface (table) under the gaseous film maintained over the anisotropic monolithic linear coating made in accordance with this invention. A thin film, smooth in the direction of movement, forms spontaneously as a result of extreme anisotropic hydrophobicity of the fractal coating. The water table is denoted by M and the gaseous film by P.

What is claimed is:

1. A superhydrophobic coating used as a substrate for gaseous lubricant of very low viscosity, which reduces the fluid skin friction drag, having a developed three-dimensional surface with concave and convex forms situated parallel to each other and to the fluid flow direction, characterised in that it has a fractal structure of hierarchic design, whose forms of the first hierarchic level(2), (3), (9) are located next to the coating substrate, whereas the forms of each successive hierarchic level (3), (33), (99) are located on the surface of forms of previous hierarchic levels, while the forms of individual structures of higher levels reiterate the shape of forms of lower hierarchic levels and the structure comprises forms of at least two hierarchic levels of grooves (2), (22) and ridges (3), (33), (99) and the surface has anisotropic geometry, maximally developed fractally in the direction transverse to the direction of flow and as smooth as possible in the direction of flow and has channels located in the coating's substrate to ensure gas flow.

2. The coating of claim 1, characterised in that it has a monolithic structure wherein the fractal grooves (2), (22) and ridges (3), (33), (99) are located directly on the surface of the material's layer (1).

3. The coating of claim 2, characterised in that it has a porous substrate with interconnected pores.

4. A coating of claim 3, characterised in that the grooves (2), (22) and ridges (3), (33) determine an omega-shaped contour of the cross section.

5. The coating of claim 3, characterised in that the grooves (2), (22) and ridges (3), (33) determine a sinusoidal contour of the cross section.

6. The coating of claim 3, characterised in that that the grooves (2), (22) and ridges (9), (99) determine a steplike contour of the cross section.

7. The coating of claim 2, characterised in that it has a uniform substrate, equipped with interconnected channels (4).

8. The coating of claim 1, characterised in that it has a semi-openwork structure wherein fractal grooves (2), (22) and ridges are situated in fibres (7) supported by the coating's substrate.

9. The coating of claim 8, characterised in that the fibres (7) are supported by the coating's substrate in a linear fashion.

10. The coating of claim 8, characterised in that the fibres (7) are supported by the coating's substrate in a pointwise fashion.

11. The coating of claim 1, characterised in that it has a semi-openwork structure wherein fractal grooves (2), (22) and ridges are situated in bundles (8) of fibres (7) supported by the coating's substrate.

12. The coating of claim 1, characterised in that it has a openwork structure wherein the fractal grooves (2), (22) and ridges (3), (33) are located in hairs (12), (12') whose bases are set in the substrate of the coating.

13. The coating of claim 12, characterised in that the hairs (12), (12') are attached with their both ends in the substrate of the coating, thus forming loops.

14. The coating of claim 11, characterised in that the hairs have flexible inserts (13).

15. The coating of claim 12, characterised in that the hairs (12), (12') have the structure of a woven layer (15).

16. The coating of claim 15, characterised in that the woven layer (15) has a parallel weave.

* * * * *